United States Patent
Wego et al.

(10) Patent No.: US 8,660,146 B2
(45) Date of Patent: Feb. 25, 2014

(54) TELECOM MULTIPLEXER FOR VARIABLE RATE COMPOSITE BIT STREAM

(75) Inventors: Arild Wego, Lier (NO); Pål Longva Hellum, Blommenholm (NO)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 458 days.

(21) Appl. No.: 12/812,683

(22) PCT Filed: Jan. 15, 2008

(86) PCT No.: PCT/EP2008/050408
§ 371 (c)(1),
(2), (4) Date: Jul. 13, 2010

(87) PCT Pub. No.: WO2009/089905
PCT Pub. Date: Jul. 23, 2009

(65) Prior Publication Data
US 2010/0296523 A1   Nov. 25, 2010

(51) Int. Cl.
*H04J 3/00* (2006.01)
(52) U.S. Cl.
USPC ............ 370/476; 370/535; 370/538; 370/509; 370/512
(58) Field of Classification Search
USPC ............ 370/395.5, 395.1, 395.6, 398, 395.51, 370/476, 535, 539, 516, 537, 538, 509, 512, 370/514, 520
See application file for complete search history.

(56) References Cited

U.S. PATENT DOCUMENTS

| | | | | |
|---|---|---|---|---|
| 5,040,170 A | * | 8/1991 | Upp et al. | 398/50 |
| 5,185,736 A | * | 2/1993 | Tyrrell et al. | 370/358 |
| 5,319,637 A | * | 6/1994 | Taniguchi et al. | 370/522 |
| 5,572,521 A | * | 11/1996 | Pauwels et al. | 370/412 |
| 5,706,285 A | * | 1/1998 | Saijonmaa et al. | 370/230.1 |
| 5,917,818 A | * | 6/1999 | Ko et al. | 370/377 |
| 5,923,384 A | * | 7/1999 | Enomoto et al. | 348/705 |
| 5,940,456 A | * | 8/1999 | Chen et al. | 375/356 |
| 6,088,413 A | * | 7/2000 | Autry et al. | 375/372 |
| 6,151,336 A | * | 11/2000 | Cheng et al. | 370/535 |

(Continued)

FOREIGN PATENT DOCUMENTS

| | | |
|---|---|---|
| EP | 0428407 A | 5/1991 |
| WO | WO 99/62234 A | 12/1999 |

OTHER PUBLICATIONS

ITU-T Recommendation G.742. "Second Order Digital Multiplex Equipment Operating at 8448 kbit/s and Using Positive Justification", 1993.

(Continued)

*Primary Examiner* — Ricky Ngo
*Assistant Examiner* — Dewanda Samuel

(57) ABSTRACT

A multiplexer/demultiplexer (MUX/DEMUX) system for multiplexing and demultiplexing information from a plurality of traffic channels is configured according to a Plesiochronous Digital Hierarchy (PDH) standard into a composite signal transferred to and from a telecommunciations interface. A PDH traffic interface receives PDH channel signals from a plurality of PDH channels and a bit-pipe interface receives bit-pipe traffic transported as a packet data stream. A composite signal generation module and interface then creates, outputs and receives a single composite serial data stream including, in a single composite format, information from the received PDH channel signals as well as the packet data stream. The rate of the bit-pipe traffic may be adaptively modulated as a function of the composite rate.

17 Claims, 16 Drawing Sheets

(56) References Cited

U.S. PATENT DOCUMENTS

| | | | | |
|---|---|---|---|---|
| 6,167,062 | A | * | 12/2000 | Hershey et al. ............... 370/503 |
| 6,301,228 | B1 | * | 10/2001 | Bordogna et al. ............ 370/244 |
| 6,519,261 | B1 | * | 2/2003 | Brueckheimer et al. . 370/395.52 |
| 6,628,679 | B1 | * | 9/2003 | Talarek .......................... 370/536 |
| 6,678,333 | B1 | * | 1/2004 | Yamashita ............... 375/240.28 |
| 7,075,952 | B1 | * | 7/2006 | Torma et al. .................. 370/538 |
| 7,149,432 | B1 | * | 12/2006 | Smith et al. ................... 398/158 |
| 7,224,700 | B2 | * | 5/2007 | Lhermite et al. ............. 370/468 |
| 7,821,938 | B2 | * | 10/2010 | Friedman et al. ............ 370/232 |
| 2003/0035445 | A1 | | 2/2003 | Choi |
| 2003/0067655 | A1 | * | 4/2003 | Pedersen et al. .............. 359/152 |
| 2008/0259901 | A1 | * | 10/2008 | Friedman et al. ............. 370/349 |

OTHER PUBLICATIONS

ITU-T Recommendation G.751: "Digital Multiplex Equipments Operating at the Third Order Bit Rate of 34 368 kbit/s and the Fourth Order Bit Rate of 139 264 kbit/s and Using Positive Justification", 1993.

* cited by examiner

TELECOM MULTIPLEXER FOR VARIABLE RATE COMPOSITE BIT STREAM

TECHNICAL FIELD

This invention involves a multiplexer for use in multi-channel communications systems that support different formatting protocols.

BACKGROUND

Ever more efficient use of channel bandwidth is a never-ending goal of telecommunications systems. As technology evolves, from analog signals over copper wires, to digital wireless and optical fiber networks, so too does the bandwidth, and thus both the opportunities and challenges of the problem.

One such challenge arises from the different transport protocols and standards in use. For example, some protocols (such as the Ethernet) specify asynchronous transmission, while others, such as the Synchronous Digital Hierarchy (SDH) and Synchronous Optical Networking (SONET) standards, rely on tight synchronization. Still other systems are designed according to one of the Plesiochronous (from Greek plesio+chronos, meaning "near time") Digital Hierarchy (PDH) standards, in which different parts of the telecommunications system are almost synchronised, that is, are synchronized to within some predetermined acceptable deviation.

Common for these standards is that each specifies transmission of data (including voice data) as a series of "frames" with a fixed framing format. Some widespread formats are commonly designated T1 (used mostly in North America and parts of Asia), the faster E1 (2.048 Mbits/s PDH serial bitstream), E2 and E3 (34.368 Mbits/s PDH serial bitstream), formats (used in Europe and most of the rest of the world), as well as some others found mostly in Japan. One result of this, though, is that according any one of these framing formats, it is not feasible to combine, for example, PDH and Ethernet traffic in a single frame structure.

Some attempts to alleviate this problem are themselves part of newer standards. For example, the Telecommunication Standardization Sector of the International Telecommunication Union (ITU-T) has specified standards for multiplexing four E1s into a single E2 in ITU-T Rec. G.742, and for multiplexing four E2s into a single E3 in ITU-T Rec. G.751. Both of these, by definition, set limits on the number of E1s or E2s that can be transmitted over a composite rate.

United States Published Patent Application No. 2003/0035445 A1, published 20 Feb. 2003 and entitled "Integrated Ethernet and PDH/SDH/SONET Communication System" discloses a communication system for communicating Ethernet and PDH/SDH/SONET data using time division multiplexing (TDM) techniques from an Ethernet unit. One drawback of this system is that it presupposes an Ethernet unit and a transceiver, with only Ethernet traffic on the packet interface.

U.S. Pat. No. 7,075,952, issued in the name of Torma, et al. on 11 Jul. 2005 and entitled "Multiplexing in a PDH Telecommunications Network" specifies a method for multiplexing "at least one traffic source from a group in which a number of PCM signals constitutes a first traffic source and a number of packet data streams constitutes a second traffic source." The disclosed method is specifically intended for transferring Asynchronous Transfer Mode (ATM) traffic through a PDH network. One disadvantage of this method that it operates with a relatively coarse granularity, at the level of Pulse Code Modulation (PCM) on a first interface, which may be as low as 64 kbit/s instead of 2.048 Mbit/s or even just 1.544 Mbit/s. Another disadvantage is that it requires each PCM signal to be configured and allocated to a specific portion of the frame; for large frames, this leads to a great deal of configuration data.

EP 0428407 discloses a communication link in a communication network which dynamically allocates bandwidth to different channels, where at least three different types of information may be carried by these channels. The link carries multiple types of information in a multiplexed manner.

Another drawback of both of these known systems is that they provide no possibility for adaptive modulation, that is, the rate on the packet stream cannot change without reconfiguration of the frame structure. This lack of flexibility can lead to a needless loss of traffic.

SUMMARY

The invention provides a multiplexer/demultiplexer (MUX/DEMUX) system for multiplexing and demultiplexing information from a plurality of traffic channels configured according to a Plesiochronous Digital Hierarchy (PDH) standard into a composite signal transferred to and from a telecommunications interface (140). A PDH traffic interface receives PDH channel signals from a plurality of PDH channels, which may be greater than four in number. A bit-pipe interface receives a bit-pipe traffic data stream. A composite signal generation module and interface outputs and receives a single composite serial data stream including, in a single composite format, information from the received PDH channel signals as well as the packet data stream.

In one embodiment, the MUX/DEMUX system includes a MUX frame controller; a frame synchronization generator that generates frame syncs for the MUX frame controller; and at least one frame format memory that stores frame format descriptions.

In cases where the bit-pipe traffic has a variable rate, the MUX frame controller senses a change in a rate of the composite serial data stream and thereupon changes the capacity of the variable-rate bit-pipe accordingly, but without changing a frame structure of the composite serial data stream, thereby adaptively modulating the composite serial data stream.

The plurality of PDH channels may be configured according to the E1, E2 or E3 standards and the bit-pipe traffic data stream may include data transported as packets, such as Ethernet traffic, or data transported according to a Synchronous Digital Hierarchy (SDH) protocol.

Each frame format description may include a first portion for committed data and a second portion for any uncommitted data. The composite signal generation module and interface may then generate the single composite serial data stream by sequentially reading the frame format descriptions from the frame format memory, thereby alternately reading and adding to the single composite serial data stream the first and second portions. In one embodiment, the first portions each store data according to the E1 standard.

The MUX/DEMUX system may be included in a telecommunications system in which a basic node creates a plurality of traffic channels. The MUX/DEMUX then receives the signals to be multiplexed from the basic node and outputs them to a telecommunications interface, such as a wireless (radio) device.

Depending on design choices that skilled telecommunications engineers will understand, different aspects of different embodiments of the invention provide various advantages, some of which include:

The multiplexer/demultiplexer, referred to generally as the "Flat MUX", is non-hierarchical, such that it can multiplex and demultiplex signals using a single MUX/DEMUX structure.

Data from different signal sources, according to different standards, may be stored in at least one format memory in a "matrix" representation (row, column) and committed and uncommitted data are transmitted alternately row-by-row. This eliminates the need found in the prior art to transmit all committed data as a block followed by all committed data as a block. One consequence of this structure is that users can switch from the PDH standard to a packet-based standard (Ethernet, SDH, etc.) gradually, with no need to replace or reconfigure hardware.

Prior art, standardized MUXes for multiplexing several E1s into a composite rate are limited to fixed frame formats. For example, a PDH MUX according to the E1-to-E2 multiplexing scheme specified in the ITU-T standard G.742 specifies a format for multiplexing four E1 channels into one E2 channel. The Flat MUX, however, is more flexible, and sets no theoretical limit on the number of E1s and E3s that it can multiplex into a single composite signal. Any combination of E1s and E3s is also possible, and it is possible to both add and reduce the number of E1s and E3s without disturbing the traffic on the already existing E1s and E3s.

The Flat MUX may also make it possible to include a variable-rate bit pipe in the composite signal.

The Flat MUX supports adaptive modulation, such that if the composite rate changes, the bit-pipe rate will follow the composite rate so that the composite payload is most efficiently utilized.

This adaptive ability can, moreover, typically be accomplished without introducing bit faults. Similarly, bit faults are also reduced or eliminated during re-allocation of user bandwidth between PDH channels and the bit-pipe, at least with respect to the PDH channels not affected by the reallocation.

Control information may be transported on dedicated channels so as to avoid negatively impacting this utilization. The Flat MUX is also particularly error-tolerant.

The Flat MUX may also reduce the impact of intrinsic jitter and wander introduced on PDH rates that are caused by frequency differences between the composite rate and the MUX framing rate.

The Flat MUX has a simple design, which reduces logic consumption. Moreover, the MUX—one exemplifying embodiment of which is discussed in detail—is easily adaptable, for example, to the ANSI standard.

DETAILED DESCRIPTION

For the sake of succinctness, the system and method according to the invention and disclosed here is referred to as the "Flat MUX" since it is non-hierarchical and can directly multiplex and demultiplex several E-type channels and/or a configurable number of PDH channels into a single, composite, serial bit stream, while also making possible a variable bit-pipe of the kind used for packet traffic by using a part of the composite bandwidth.

The Flat MUX is of course not intended to exist in isolation, but rather is a particularly efficient component of an overall telecommunications system that accommodates different channel technologies and framing formats.

Several numerical values are given for various aspects of the embodiment of the invention illustrated and discussed below. These are merely example of one practical implementation and can be varied by skilled telecommunications systems designers according to the needs of a given implementation. This applies even to the number of PDH channels the Flat MUX is configured to handle: One advantage of this invention is that the Flat MUX has practically no theoretical limit on the number of PDH channels it can handle. For example, in one design specification, an embodiment of the invention could support at least 72 E1s or 96 DS1s (another known framing structure) and at least four E3s or 2 DS3s against a single basic telecom node.

Figure 1:
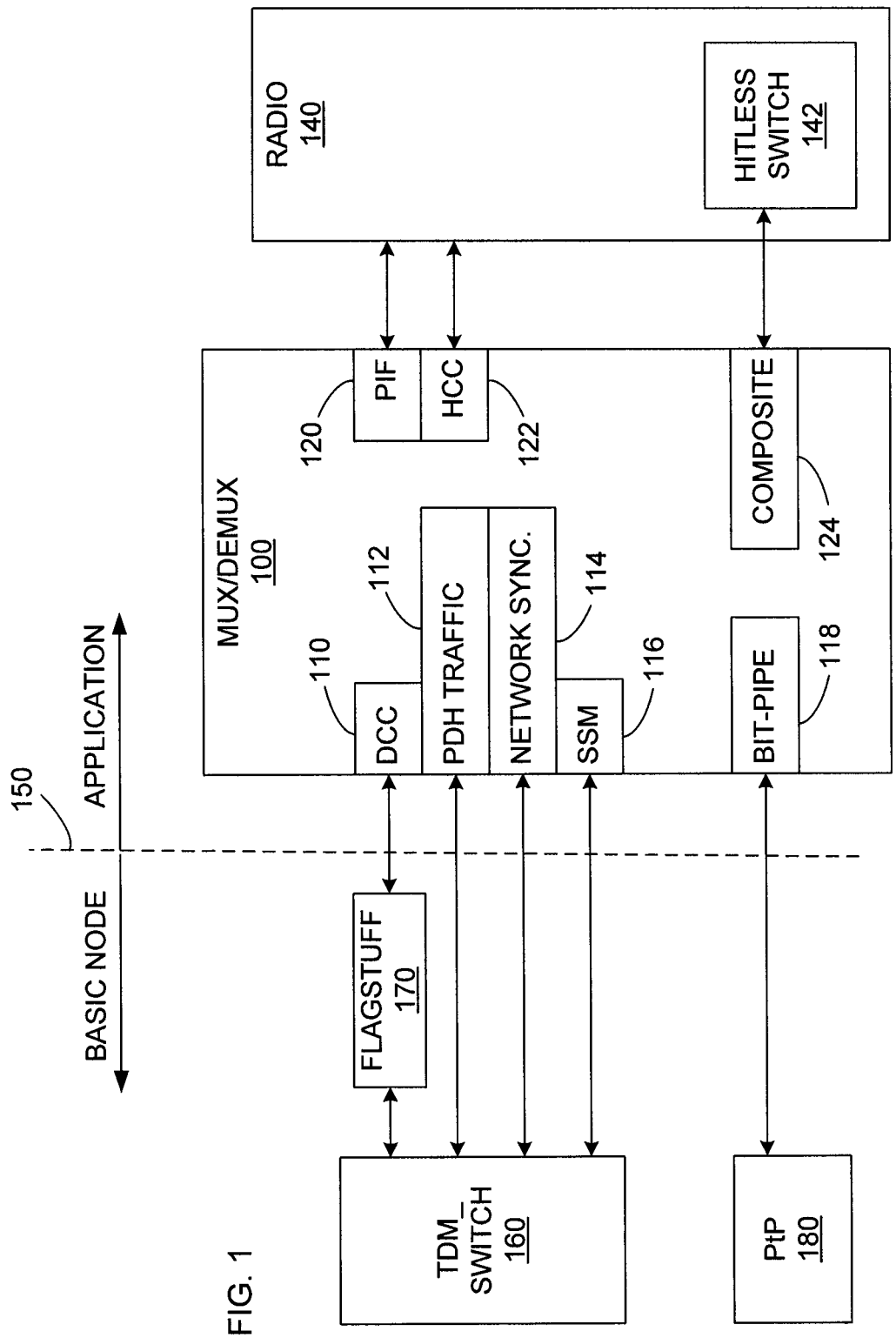
FIG. 1 is a block diagram that shows a multiplexer/demultiplexer (MUX/DEMUX) block according to one embodiment of the invention.

FIG. 1 is a block diagram that shows a multiplexer/demultiplexer (MUX/DEMUX) block 100 according to one embodiment of the invention, as well as interfaces to various external components. In FIG. 1, these interfaces, named for the signals they transfer, are:

110: D Control Channel(s) (DCC)
 112: PDH traffic
 114: Network Synchronization
 116: Synchronization Status Message (SSM)
 118: Bit-pipe signals
 120: Processor Interface (PIF)
 122: H Control Channel(s) (HCC)
 124: Composite signal interface These various interfaces are preferably co-directional, that is, with both data and clock signals passing in both directions. The PDH interfaces are preferably bit oriented. Although not specifically illustrated, when a Loss of Framing (LOF) signal is detected on the composite input 124, an Alarm Indication Signal (AIS) is preferably generated on the PDH traffic ports out from the DEMUX circuitry of the unit 100. The AIS is preferably selectable between a local oscillator and the sync rate of whichever network the invention is implemented in.

An illustrated Basic Node (show to the left of line 150) may include at least one TDM switch 160, which communicates with the MUX/DEMUX unit via interfaces 110-116. Between the D Control Channel 110 interface and the TDM switch 160, an additional, but typical, flagstuffing block 170 for rate adaptation is interposed.

A Point-to-Point block 180 is a source of data for the bit-pipe. Communication between the PtP block 180 and the bit-pipe interface 118 will generally be necessary for both timing information and I/O data. In one specified design implementation, 16-bit data was architected for both receive (RX) input data and transmit (TX) data. A contra-directional clock (having timing signals with both directions of transmission directed towards the subordinate equipment) was specified as the RX input clock, and an and co-directional clock (clock and data having the same source) was specified as the TX output clock.

For both the RX and TX bit-pipe rates, a serial or parallel interface was specified to signal the bit-pipe rate and also changes to that rate to the PtP block 180. These rates may be calculated in any known manner as a function of the number of PDH columns used for the bit-pipe.

An acknowledge signal (ACK) was also included to indicate that the PtP block detected the rate change, as well as conventional signals indicating various alarm states and loss of framing (LOF). When LOF was detected on the composite input 124, and alarm was issued to the PtP block 180.

Some channels for transporting control information and synchronization information will generally also be needed: The control channels are used to send control information over the chosen telecom link. Synchronization signals will typically include one like SSM, which indicates the quality of the synchronization signal, and a network synchronization signal that is used for transporting synchronization from one side of the link to the other in cases where no synchronization carriers are available. Accordingly, according to one specification for an embodiment of the invention, the Flat MUX also supported transport of at least the following miscellaneous channels:

Two data communication network (DCN) channels operating against the Basic Node with a minimum total capacity of 64 kbit/s per seventh tributary (E1/DS1). The interface was bit-oriented with both clock and data in both the TX and RX directions. Contra-directional timing was specified in the TX direction, that is, the MUX 100 decided the timing. Flag-stuffing (see component 170) was then used for rate justification between the incoming DCN channel and the MUX rate, as well as between the DEMUX rate and the nominal outgoing DCN channel rate.

Two HCC channels with approximately 64 kbits total capacity against an included modem application (shown as a "hitless switch" 142). The application-to-MUX timing was preferably also contra-directional.

An SSM propagation signal against the Basic Node, one example of which is a 4-bit wide SSM interface 116 between the MUX 100 and TDM_SWITCH 160.

A network signal propagation channel against the Basic Node; this may be implemented using the interface 114, which can be single-bit.

The single composite interface 124 may be implemented against the "hitless switch" modem application or device within a wireless (radio) interface 140—the context of the invention is telecommunications, such that the multiplexed and demultiplexed signals are intended for some telecom device. As is well understood in the art, a "hitless switch" is a device that can switch between different channels, formats, etc. (depending on the context) without inducing or experiencing any significant change in signal timing, phase, amplitude, etc. (again depending on the context).

In this case, the output composite rate from the MUX 100 may be sourced from the modem application, that is, contra-directional timing is preferably used since the composite rate may change suddenly, albeit it usually in predefined steps, in the presence of adaptive modulation on the radio interface, which is preferably a byte interface.

Figure 2:
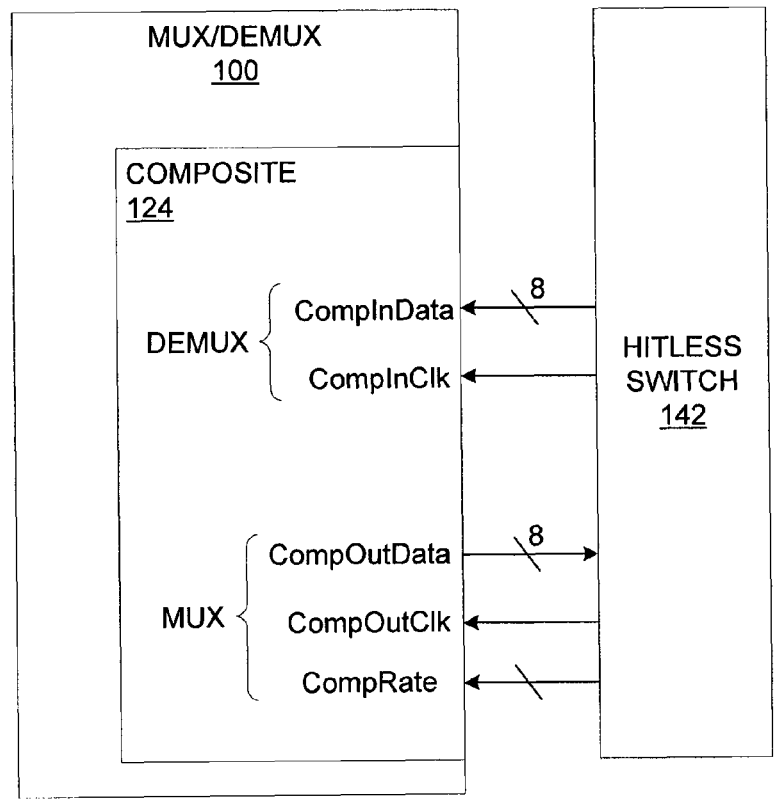
FIG. 2 illustrates one example of a composite interface.
Figure 3:
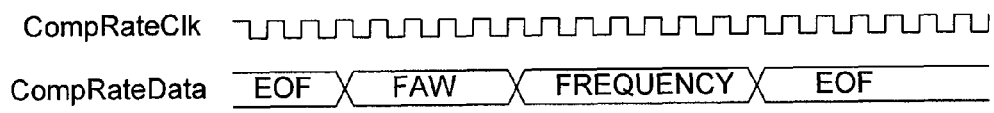
FIG. 3 illustrates one example of a suitable timing pattern for composite rate data.

One embodiment of the invention also allows for adaptive modulation rate changes. In such implementations, the interface 124 must also be provided with some signal for preparing the MUX 100 for such changes. This may be implemented as a one-bit serial interface, where rate and change information is continuously coded into a serial bit-stream. FIG. 2 illustrates one example of the composite interface and FIG. 3 illustrates one example of a suitable timing pattern for composite rate data. In this illustrated example, the Composite Rate (CompRate) interface may consist of a serial clock and data, where the serial bit stream comprises a frame with a frame-alignment word (FAW), a Frequency field indicating what the frequency should be, and an End-of-Frame (EOF) field that terminated the field so that false frame alignment can be detected and avoided.

Some more details of one embodiment of the invention, in particular a Flat MUX controller, will now be explained. As a general matter, the Flat MUX controller is a MUX and DEMUX frame format parser and scheduler. The controller also includes a frame sync generator (FSG) and at least one frame format memory that holds the frame format description. The TX input and the Rx outputs include data traffic channels such as E1, E3 and PtP data, as well as service channels as DCC and HCC. The TX output and the RX input are composite byte streams to and from the radio interface. These components are shown generally in FIGS. 1 and 2.

Figure 4:
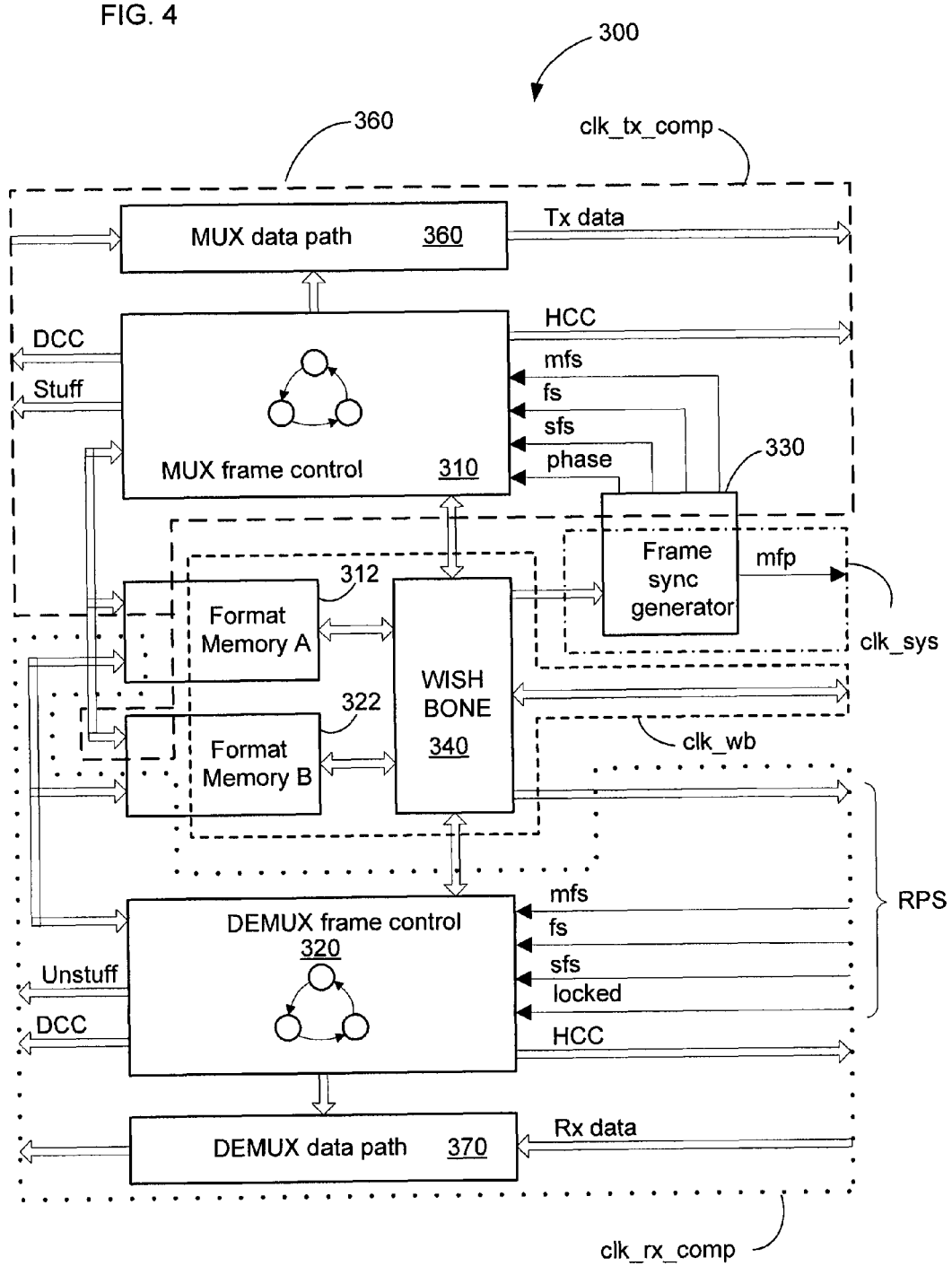
FIG. 4 illustrates the general structure of one example of a Flat MUX controller in accordance with one embodiment of the invention.

FIG. 4 illustrates the general structure of one example of the Flat MUX controller 300 according to one embodiment of the invention. As can be seen, this example of Flat MUX control block 300 consists of a MUX and a DEMUX frame control block, 310 and 320, respectively with associated format memories 312, 322 (alternatively labelled Format memories A and B, respectively, in the various figures). A frame sync generator 330 generates frame syncs for the MUX frame controller. The blocks are configured and controlled via a Wishbone bus interface 340, which is a known interface.

General Structure

In this example, there are four clock domains in the Flat MUX control block, which are delimited in FIG. 4 by respective dashed lines:
1) system clock (clk_sys);
2) TX composite clock for the MUX transmit structure (clk_tx_comp);
3) RX composite clock for the DEMUX receive structure (clk_rx_comp); and
4) Wishbone interface clock (clk_wb).

TX Fractional Divider

A TX fractional divider may be included for generating a time base for the various clock signals. One example of a suitable fractional divider is a numerically controlled oscillator whose function can be characterized as:

$$f_{out} = \frac{\text{Numerator}}{\text{Denominator}} \cdot \text{system frequency} = \frac{N}{D} \cdot f_{sys}$$

where the output frequency $f_{out}$ is created by accumulating in the numerator at the system clock rate $f_{sys}$. When the accumulator (nominator) becomes equal to or greater than the value of the denominator, then the value of the denominator is subtracted from the accumulator and the clock enable pulse is set during one system clock period.

Figure 5:
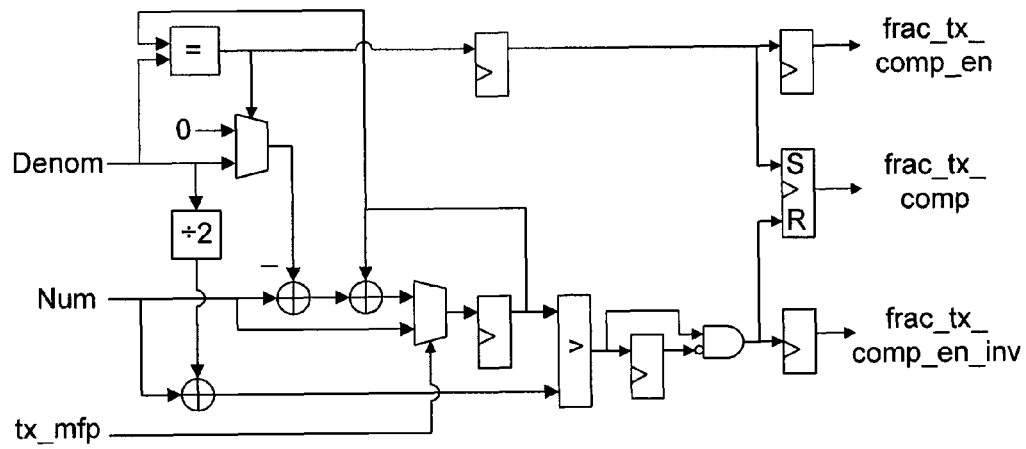
FIG. 5 illustrates one example of logic that can implement a TX fractional divider.

FIG. 5 illustrates one example of logic that can implement the TX fractional divider. As can be seen, the inverted clock enable pulse is generated when the accumulator is greater than N+D/2. The numerator is added to the divided denominator to compensate for the offset that is added in the accumulator. The multi-frame pulse loads the numerator into the accumulator registers, which yields a predictable relation in time between the frame pulses and the Tx clock enable signal.

Interface

An example of the signal interface for the illustrated TX fractional divider is given in Table 1:

TABLE 1

| Signal | Dir | Width | Comment |
|---|---|---|---|
| clk_sys_rst_n | In | 1 | System reset |
| clk_sys | In | 1 | System clock |
| MUX tx_num | In | 16 | Tx clock fractional divider numerator |
| tx_denom | In | 16 | Tx clock fractional divider denominator |
| tx_mfp | In | 1 | Tx multi-frame pulse |
| frac_tx_comp_en | Out | 1 | Tx clock enable, rising clock edge |
| frac_tx_comp_en_inv | Out | 1 | Tx clock enable, falling clock edge |
| frac_tx_comp | Out | 1 | Tx output composite clock |

Figure 6:
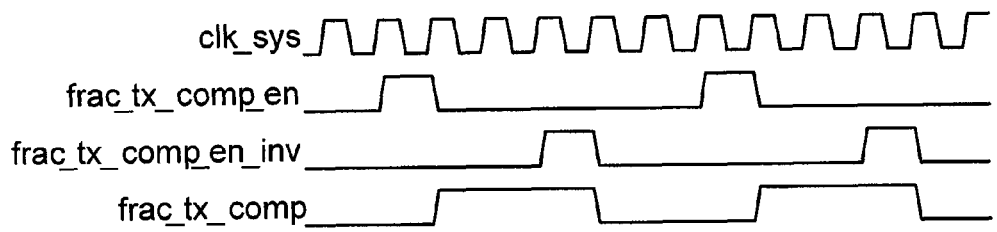
FIG. 6 an example of output timing for a composite clock.

The composite clock may then be generated from the clock enable pulses. An example of the output timing is illustrated in FIG. 6.

Frame Sync Generation (FSG)

In one embodiment of the invention, the frame sync generator 330 in transmitter generates and uses three synchronization signals (syncs) to ensure proper frame timing: 1) multi-frame sync (mfs); frame sync (fs); and 3) sub-frame sync (sfs). The syncs may be generated from and therefore related to the system frequency of the modem 142 transmitter.

Figure 7:
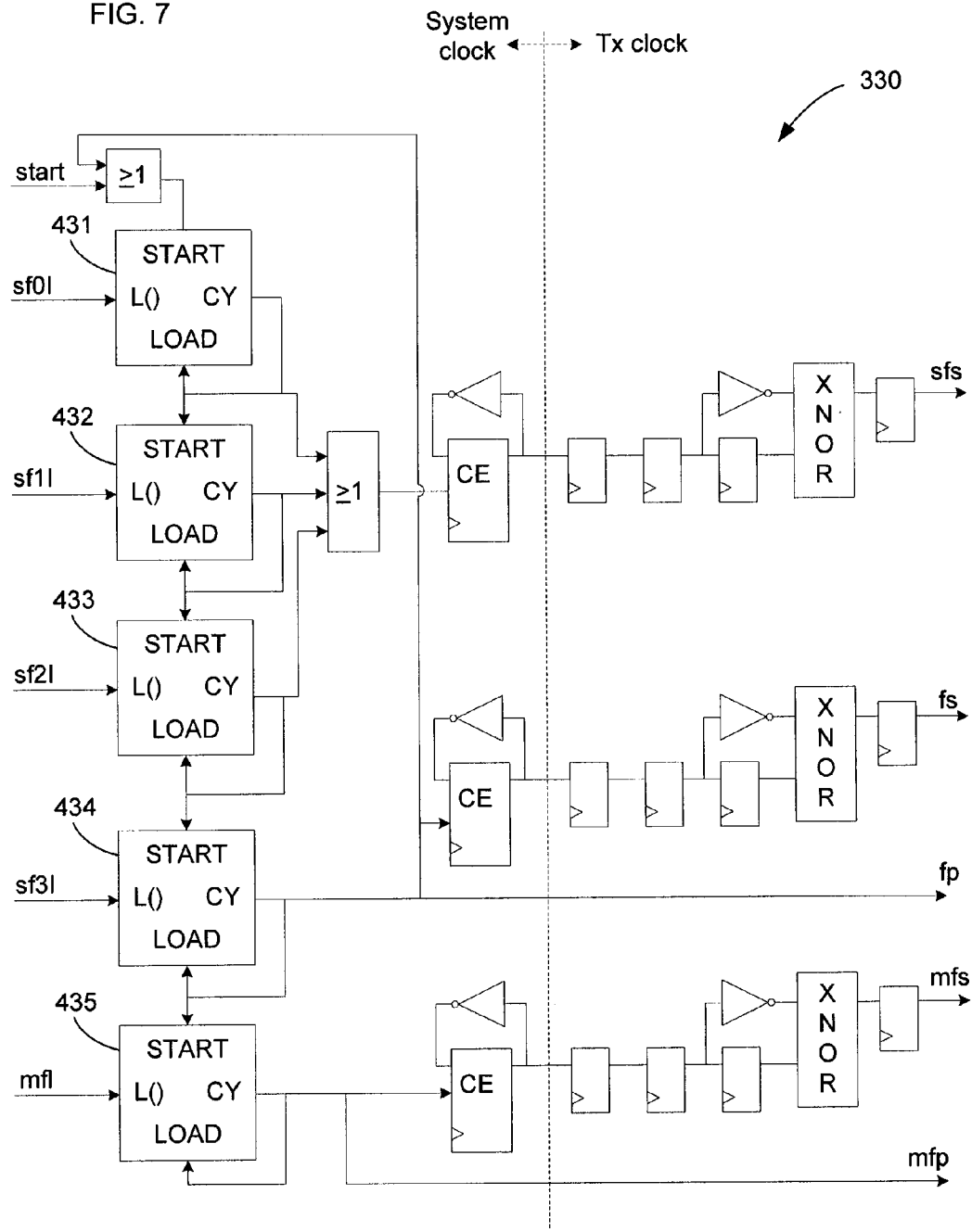
FIG. 7 shows an example of logic used in one embodiment of the invention to implement frame sync generation.

The illustrated frame sync generation comprises five counters 431-435, as shown in the example logic illustrated in FIG. 7. The counters may be loaded with counter values from the Wishbone interface, which enables a certain flexibility to use an asymmetric frame structure where the sub-frames may be of different length. The number of frames per multi-frame is also register-controlled. The counters may all loaded at reset, and pulse generated at the release of the system clock reset signal may be used a as a start signal.

The illustrated counter structure also generates a multi-frame pulse and a frame pulse as shown in FIG. 7. These signals may be one system clock pulse and are used to synchronize data in the system clock domain.

Figure 8:
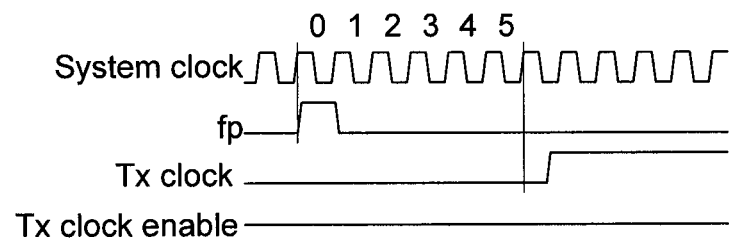
FIG. 8 illustrates a phase counter with an asynchronous relation between a system clock and a Transmit (TX) clock.
Figure 9:
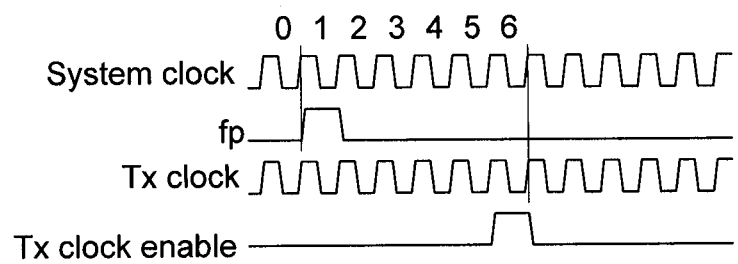
FIG. 9 illustrates a phase counter in a case in which the TX clock is the same as the system clock.

The frame header contains a phase field that is used to realign the phase relation of the composite receive clock and the system clock in the receiver. The phase counter counts the number of completed system clock periods between the frame pulse above and a positive edge (for example) of the composite transmit clock. These relationships are illustrated in FIG. 8, which illustrates a phase counter with an asynchronous relation between the system clock and the TX clock, and FIG. 9, which illustrates the phase counter when the TX clock is the same as the system clock.

The transmitter composite clock and the system clock may be regarded as asynchronous to each other. The phase relation value may for example be calculated with a counter 702 in the system clock domain and then transferred to the transmitter clock domain.

Figure 10:
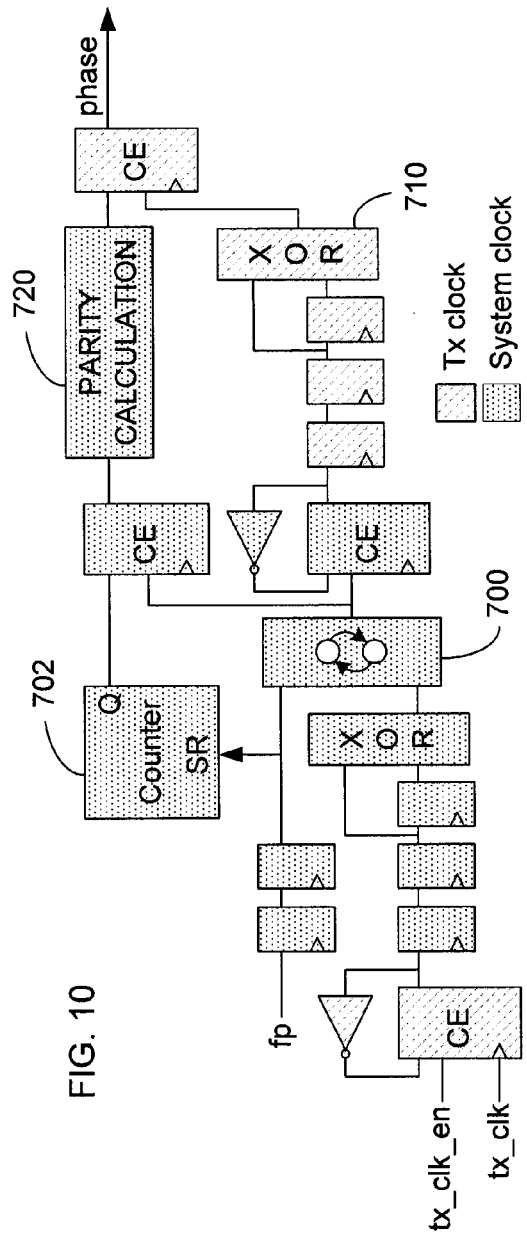
FIG. 10 shows the structure of one example of a frame sync phase counter.

Using a structure such as is illustrated in FIG. 10, the frame pulse may be used to synchronously reset the counter. The frame pulse may then also activate a state machine 700 (see also FIG. 11) that may be used to create a clock enable pulse to a sample-and-hold register.

Figure 11:
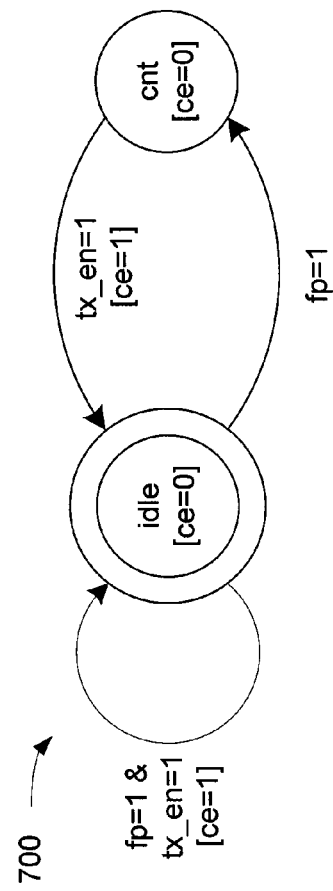
FIG. 11 is a diagram of the state machine structure of a phase counter.

A TX clock feedback loop register may be used to generate a signal that changes value at the TX composite clock rate. The XOR gate 710 generates a TX clock enable signal, tx_en, which is synchronous to the system clock. This pulse is used, according to the state machine, to return to the idle state and to issue the clock enable pulse as shown in FIG. 11. The clock enable signal is then also transferred to the TX clock domain and there used as a clock enable signal for the phase register. The phase value parity is calculated using any known logic 720 and added as any predetermined bit.

Interface

An example of the signal interface for the frame sync generation block is described in Table 2:

TABLE 2

| Signal | Dir | Width | Comment |
|---|---|---|---|
| clk_sys_rst_n | In | 1 | System reset |
| clk_sys | In | 1 | System clock |
| MUX clk_tx_comp_rst_n | In | 1 | Tx reset, active low |
| clk_tx_comp | In | 1 | Tx clock |
| clk_tx_comp_en | In | 1 | Tx clock enable |
| tx_sf0lr | In | 16 | Tx sub-frame 0 length register |
| tx_sf1lr | In | 16 | Tx sub-frame 1 length register |
| tx_sf2lr | In | 16 | Tx sub-frame 2 length register |
| tx_sf3lr | In | 16 | Tx sub-frame 3 length register |
| tx_mfl | In | 4 | Tx multi-frame length |
| tx_mfs | Out | 1 | TX multi-frame sync |
| tx_fs | Out | 1 | Tx frame sync |
| tx_sfs | Out | 1 | Tx Sub-frame sync |
| tx_mfp | Out | 1 | Tx multi-frame pulse |
| tx_phase | Out | 8 | Phase output signal |

MUX Frame Control

The frame control block contains a state machine with sync and frame memory format input. The frame parser input may be the same as the frame sync signals and the format description of the frame and the body size has NROWS rows and NCOLS columns. A functional description of one example of the state machine is illustrated in FIG. 12.

Figure 12:
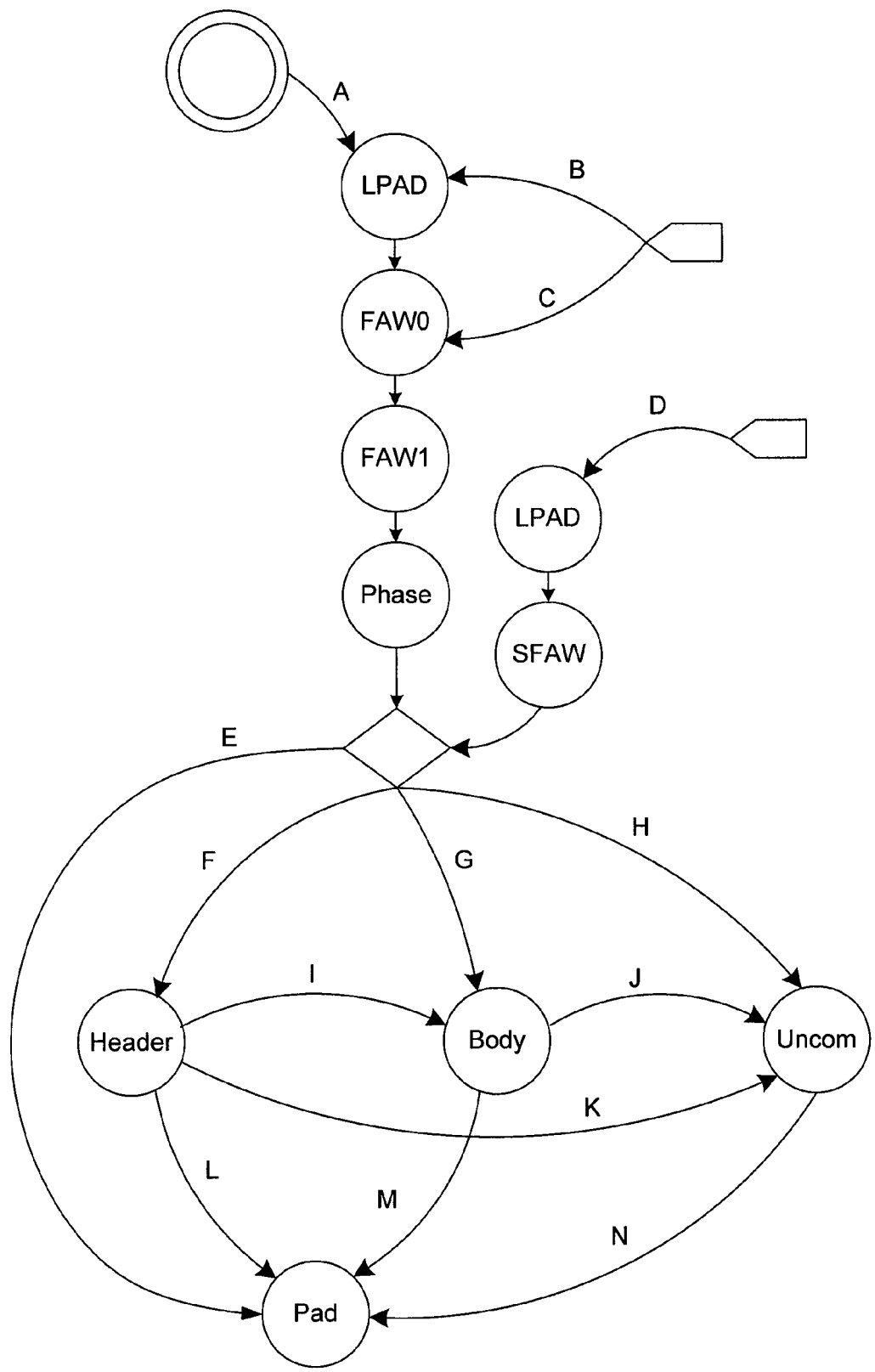
FIG. 12 illustrates one example of a MUX frame control state machine.

The meaning of the parameters in FIG. 12, which is a combined flowchart and state diagram, are either intuitive or are defined in the various Tables. Nonetheless, for convenience, the abbreviations used are:

mfs: multi-frame sync
mem_en memory enable ("_en" generally indicating "enable")
fs: frame sync
fr_cnt: frame counter
+=1: increment
sfr_cnt: sub-frame counter
format_mem: format memory
format_flag: format flag
stuff_en: enable stuffing
sfs: sub-frame sync
addr: address
header_addr: header address
header_end end of frame header?
body_end end of frame body?
uncom: uncommitted?
ncols: column number As is well known, the choice of logical state (high or "1" as opposed to low or "0") to indicate a given condition is a design choice. Actions are shown in square brackets ("[ ]"). The state transitions and related actions illustrated in FIG. 12 are as follows:

A: mfs=1 [mem_en=1]
B: mfs=0 & fs=1 [fr_cnt+=1] [sfr_cnt=0] [format_mem=format_flag] [stuff_en=true]
C: mfs=1 [fr_cnt=0] [sfr_cnt=0] [format_mem=format_flag] [stuff_en=true]
D: mfs=0 & fs=0 & sfs=1 [addr=header_addr] [sfr_cnt+=1]
E: header_end=1 & body_end=1 & uncom=0
F: header_end=0 [addr=header_addr]
G: header_end=1 [addr=header_addr]
H: header_end=1 & ncols=0
I: header_end=1 [addr=body_addr]
J: body_end=1 uncom>0
K: header_end=1 & ncols=0 & uncom=0
L: header_end=1 & body_end=1 & uncom=0
M: body_end=1
N: uncom_end=1

The frame description is divided into three parts: Header, Body and Uncommitted data. The frame format is expressed in records, such that each format record activates the corresponding source and enables the data path MUX to form the composite data stream.

The state machine is stepped each composite clock cycle to compose the composite frame format. The machine is idle in a reset state until the first multi-frame sync. The format memories are then enabled for reading.

There are two frame index counters which together are used to set the start address at the start of each new sub-frame. The sub-frame counter is incremented for each new sub-frame sync and reset at frame sync or multi-frame sync. The frame sync is incremented for each frame sync and reset by the multi-frame sync. The counters are used to index the start address of the format memories for the current frame and sub-frame.

Frame Header

The frame is started with the mandatory frame alignment word and phase information. However, the first data that is inserted into the composite stream at any multi-frame sync, frame sync or sub-frame sync is the LPAD register value. This byte belongs to the previous sub-frame but should generally always be inserted into the stream previous to the FAW.

The header format memory contains records of the remaining header information and these records are read and executed until the end mark is reached for that header. A header record is read and analyzed each clock cycle with the exception of a DCC or a HCC record, since these records contain length fields that will inhibit the header address counter for the corresponding number of cycles. In cases where the header includes only the mandatory fields, conventional header parsing is skipped and the frame parser moves on to the next format description. The parser allows transitions to body data, uncommitted PtP data or padding.

Frame Body

The body format description contains information about the order in which the tributary ports, AIS or the PtP port are to contribute data, whether stuffing is allowed or not, as well as information on how many of the bytes, for example, rows, that are to contain data in the column. (The remaining rows may contain padding.)

The stuffing procedure may be executed over a multi-frame cycle. The stuffing is executed by assertion of two signals: Stuffing control and stuffing position. Assertion of the stuffing control signal instructs the tributary port to insert stuffing control information in the data stream. An assertion of the stuffing position signal informs the tributary that stuffing may be inserted.

Figure 13:
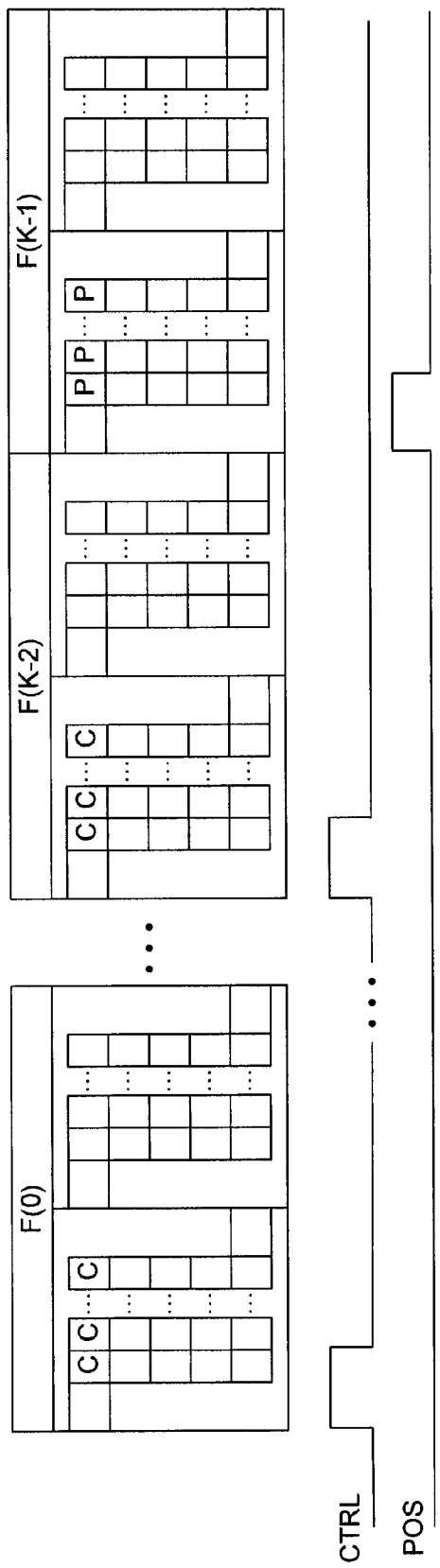
FIG. 13 illustrates multi-frame format and stuffing control.

FIG. 13 illustrates multi-frame format and stuffing control, in which K frames F(0), . . . , F(K−2), F(K−1) are illustrated along with timing diagrams for frame stuffing control and position. In FIG. 13, "C" indicates stuffing control and "P" indicates stuffing position.

The stuffing control signal for the E1 tributary ports is asserted during the first row in all of the frames but the last frame in the multi-frame. In a similar manner, the stuffing position signal is asserted during the first row of the last frame in the multi-frame. The stuffing control and position signals are then deasserted during these intervals if the frame format disallows stuffing for the respective tributary port.

The number of valid columns and rows are indicated by the NCOLS and NROWS inputs, respectively. The number of columns may vary depending on the value of a physical mode signal PHY_MODE. A column counter may be used to index the format memory location until a full row is completed, whereupon the column counter is reset and the row counter is incremented. The body records are then parsed until the row counter equals the NROWS input. The valid transitions are to uncommitted data or padding.

Uncommitted Data

An uncommitted data portion of the format memory 312 may be used to contain information on the number of additional bytes that are to be sent from the PtP bus.

Padding

The last state for each sub-frame is the padding state, where the output is padded with a PAD register value until one of the three syncs restarts the frame parser. The syncs are thus treated as synchronous interrupts. Note that the frame syncs interrupt the frame parser regardless of the present state to maintain the frame synchronization.

Frame Alignment Word (FAW) and Format Memory Switching

The start of a multi-frame or a following frame is determined by the FAW0 and FAW1 combination, for example according to Table 3, in which 0=register pattern and 1=inverted. The FAW coding also allows for immediate frame format switching between the two illustrated format memories 312, 322. The format change may be indicated at frame sync or multi-frame sync by changing the FAW patterns and the parser to switch between the format memories. The frame format may not be changed for a sub-frame.

TABLE 3

|      | FM | FAW0 | FAW1 |
|------|----|----|----|
| MFAW | A  | 1  | 1  |
|      | B  | 1  | 0  |
| FAW  | A  | 0  | 1  |
|      | B  | 0  | 0  |

PtP Traffic

The PtP traffic may be sent either as part of the frame body or as uncommitted data or a combination of both. The frame body format description may include a column record for PtP traffic and information about the number of bytes in that column. Stuffing is generally not allowed for PtP traffic so this information bit may be discarded.

The PtP bus requires an estimation of the number of bytes that are sent in the body and as uncommitted data for each sub-frame. This value is dynamic and will vary with the format specifications. The number of PtP bytes in the body may be estimated during the first row at the start of each new frame, and this value will be fixed for the remaining of the frame. The number of uncommitted data bytes may be added to this number at the start of each new sub-frame respectively. Capacity may be estimated according to the following formula:

$$PtP\ Capacity = \left[ \frac{No\ uncommitted\ data + \sum_{No\ PtP\ body\ columns} Valid\ bytes\ in\ column}{32} \right]$$

In this example, the capacity estimation output may be an 8-bit unsigned value with a resolution of 2048 kbit/s.

Interface

An example of a suitable signal interface is defined in Table 4:

TABLE 4

| | Signal | Dir | Width | Comment |
|---|---|---|---|---|
| MUX CONTROL | clk_tx_comp_rst_n | In | 1 | Tx reset, active low |
| | clk_tx_comp | In | 1 | Tx clock |
| | clk_tx_comp_en | In | 1 | Tx clock enable |
| | tx_ncols | In | 8 | Number of columns in payload |
| | tx_nrows | In | 8 | Number of rows in payload |
| | tx_mfl | In | 4 | Tx multi frame length |
| | tx_ff | In | 1 | Frame format memory register control signal |
| | tx_phy_mode | In | 2 | Physical mode register control signal |
| | tx_traffic_mux_ctrl | Out | 2 | Data path MUX control signals |
| | tx_header_mux_ctrl | Out | 4 | Data path MUX control signals |
| | tx_scr_en | Out | 1 | Scrambler enable |
| | ptp_cap | Out | 8 | Point-To-Point capacity information. The current capacity requirement is indicated in steps of 2048 kbit/s, e.g. 0x04 => 10192 kbit/s. |
| | ptp_tx_en | Out | 1 | Tx PtP enable signal |
| FSG | tx_mfs | In | 1 | Tx multi frame sync |
| | tx_fs | In | 1 | Tx frame sync |
| | tx_sfs | In | 1 | Tx sub frame sync |
| Stuff | stf_tx_ctrl | Out | 1 | Tx stuffing control. A high value indicates that the current output data shall contain a stuffing control bit. |
| | stf_tx_pos | Out | 1 | Tx stuffing position. A high value indicates that the current output data may be used for stuffing. |
| | stf_tx_en | Out | 1 | Tx stuffing buffer enable signal |
| | stf_tx_sel | Out | 8 | Tx stuffing buffer tributary contributor selection signal |
| HCC | hcc_tx_en | Out | 1 | HCC Tx enable signal |
| | hcc_tx_sel | Out | 2 | HCC Tx select input, channel 0-3. |
| DCC | stf_dcc_tx_stf_en | Out | 1 | DCC Tx stuffing enable signal<br>0 - stuffing is disabled<br>1 - stuffing is enabled |
| | dcc_tx_en | Out | 1 | DCC Tx data output enable |
| | stf_dcc_tx_nsync | Out | 1 | DCC Tx nsync data output enable. A high value indicates that the stuffing buffer should supply a new |

TABLE 4-continued

| | Signal | Dir | Width | Comment |
|---|---|---|---|---|
| | stf_dcc_tx_sel | Out | 2 | byte with stuffing information. DCC Tx channel selection |
| FORMAT MEMORIES | hfm_tx_en | Out | 1 | Tx header format memory enable signal |
| | hfm_tx_addr | Out | 9 | Tx header format memory address bus |
| | hfm_tx_data_a | In | 16 | Tx header format memory data bus |
| | hfm_tx_data_b | In | 16 | Tx header format memory data bus |
| | bfm_tx_en | Out | 1 | Tx body format memory enable signal |
| | bfm_tx_addr | Out | 8 | Tx body format memory address bus |
| | bfm_tx_data_a | In | 16 | Tx body format memory data bus |
| | bfm_tx_data_b | In | 16 | Tx body format memory data bus |
| | ufm_tx_en | Out | 1 | Tx uncommitted data format memory enable signal |
| | ufm_tx_addr | Out | 7 | Tx uncommitted data format memory address bus |
| | ufm_tx_data_a | In | 11 | Tx uncommitted data format memory data bus |
| | ufm_tx_data_b | In | 11 | Tx uncommitted data format memory data bus |

Figure 14:
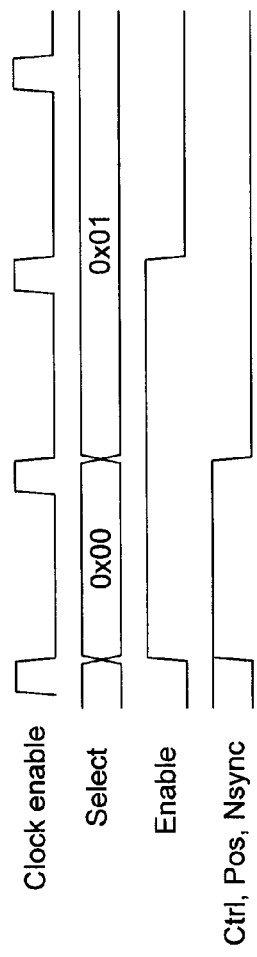
FIG. 14 shows an illustrates an example of MUX control output timing for stuff and unstuff interface operations.

The output signal timing is shown in FIG. 14. The clock in this case is assumed to be faster than the composite clock and the clock enable is therefore only active every sixth clock cycle. Another clock scenario is when the clock is the same as the composite clock. The clock enable will in this case be asserted all the time.

DEMUX Frame Control

Figure 15:
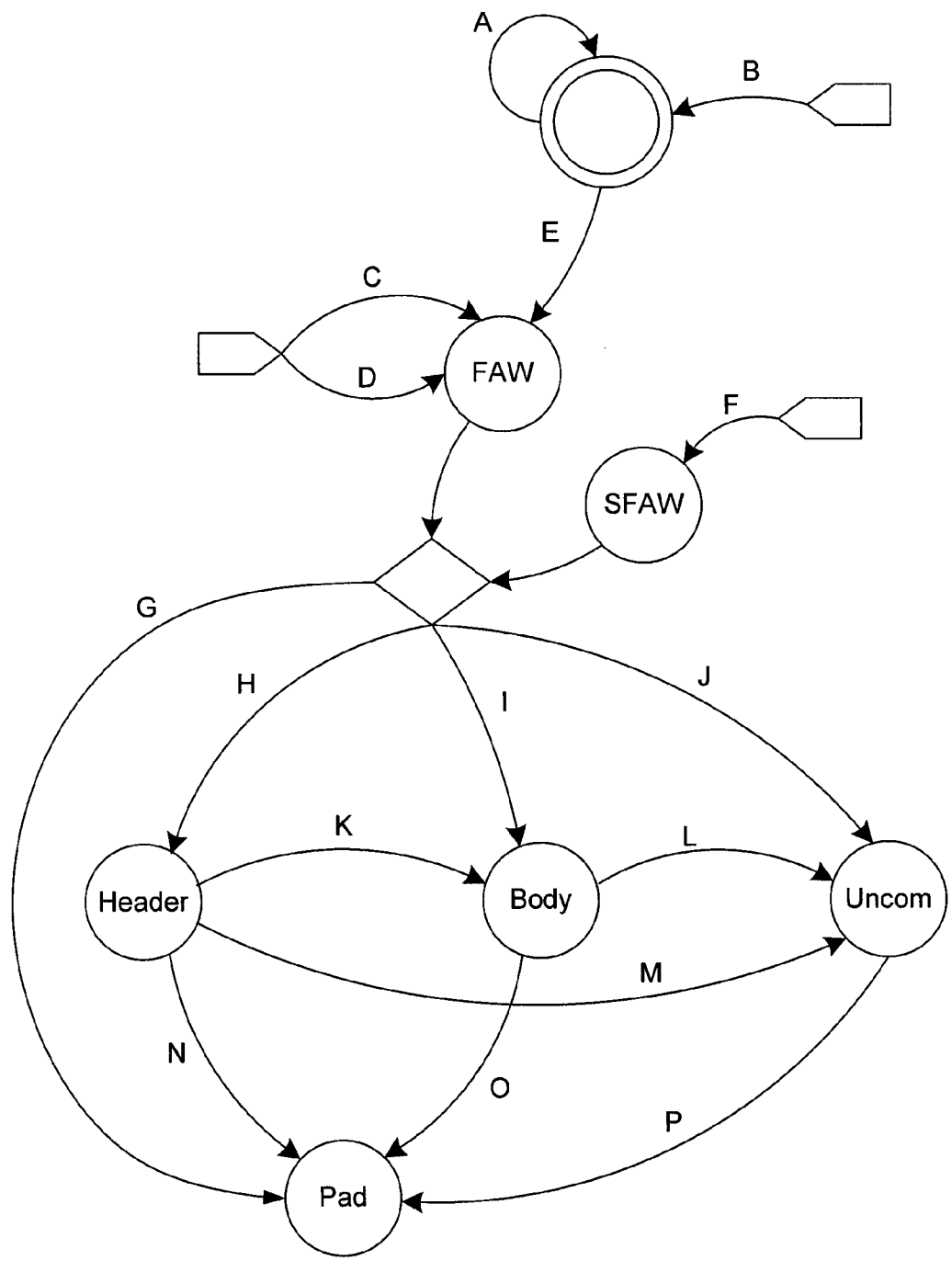
FIG. 15 illustrates a DEMUX frame control state machine.

The DEMUX frame control block implements a state machine with sync and frame memory format input. A functional description of the state machine is shown in FIG. 15. Similar to FIG. 12, the state transitions illustrated in FIG. 15 are as follows:

A: ais_on=1 [ais_en=1] (ais: Alarm Indication Signal)
B: locked=0
C: mfs=0 & fs=1 [fr_cnt+=1] [sfr_cnt=0] [format_mem=format_flag] [stuff_en=true]
D: mfs=1 [fr_cnt=0] [sfr_cnt=0] [format_mem=format_flag] [stuff_en=true]
E: locked=1 & mfs=1 [mem_en=1] [ais_en=0]
F: mfs=0 & fs=0 & sfs=1 [addr=header_addr] [sfr_cnt+=1]
G: header_end=1 & body_end=1 & uncom=0
H: header_end=0 [addr=header_addr]
I: header_end=1 [addr=header_addr]
J: header_end=1 & ncols=0
K: header_end=1 [addr=body_addr]
L: body_end=1 uncom>0
M: header_end=1 & ncols=0 & uncom=0
N: header_end=1 & body_end=1 & uncom=0
O: body_end=1
P: uncom_end=1

The DEMUX frame controller arbitrates the incoming frame data in the same way as the MUX frame controller with the difference that a Radio Protection Switch (R PS) block decodes the frame alignment and phase information bytes in any suitable manner. The RPS block therefore supplies the frame syncs and a locked indication that is used to enable the frame parser. The locked signal is used as a sync valid indicator. Whenever the locked signal is deasserted the frame parser is reset to the idle state.

The AIS enable signal is asserted when the state machine is the idle state and the AIS_on registry signal is asserted. The AIS enable signal sets the tributary in AIS mode. The AIS enable signal may also be forced at any time via a chosen registry bit.

The frame syncs from the RPS are accompanied by a frame format memory signal. This signal is sampled at frame sync and may at this point switch to the whichever of the format memories 312, 322 is currently inactive.

Interface

One example of a suitable signal interface is defined in Table 5:

TABLE 5

| | Signal | Dir | Width | Comment |
|---|---|---|---|---|
| | clk_rx_comp_rst_n | In | 1 | Rx reset |
| | clk_rx_comp | In | 1 | Rx system clock |
| | clk_rx_comp_en | In | 1 | Rx clock enable |
| DEMUX CONTROL | rx_ncols | In | 8 | Number of columns in payload |
| | rx_nrows | In | 8 | Number of rows in payload |
| | rx_mfl | In | 4 | Rx multi frame length |
| | rx_phy_mode | In | 2 | Physical mode register control signal |

TABLE 5-continued

| | Signal | Dir | Width | Comment |
|---|---|---|---|---|
| | rx_ais_mode | In | 1 | AIS mode:<br>0 - Automatic<br>1 - Manual |
| | rx_ais_on | In | 1 | AIS on signal. Controls the AIS ordering when rx_ais_mode is in manual mode. |
| | rx_descr_en | Out | 1 | Descrambler enable |
| | ptp_rx_en | Out | 1 | Tx PtP enable signal |
| RPS | rps_locked | In | 1 | Locked signal from RPS |
| | rps_rx_mf_sync | In | 1 | Multi frame sync |
| | rps_rx_f_sync | In | 1 | Frame sync |
| | rps_rx_sf_sync | In | 1 | Sub frame sync |
| | rps_rx_ff | In | 1 | Frame format memory control signal |
| STUFF | stf_rx_ctrl | Out | 1 | Rx stuffing control. A high value indicates that the current data contains a stuffing control bit. |
| | stf_rx_pos | Out | 1 | Rx stuffing position. A high value indicates that the current data contains a data bit or stuffing bit depending on the previous stuffing control bits. |
| | stf_rx_en | Out | 1 | Rx stuffing buffer enable signal |
| | stf_rx_sel | Out | 8 | Rx stuffing buffer tributary contributor selection signal |
| | stf_rx_ais | Out | 1 | Rx AIS generation control signal |
| HCC | hcc_rx_en | Out | 1 | Produces new COMP_RX output for the selected channel. |
| | hcc_rx_sel | Out | 2 | HCC Rx select input, channel 0-3. |
| DCC | stf_dcc_rx_en | Out | 1 | DCC Rx data enable |
| | stf_dcc_rx_nsync | Out | 1 | DCC Rx nsync data output enable. A high value indicates that the current data contains a stuffing control bit. |
| | stf_dcc_rx_sel | Out | 2 | DCC Rx channel selection |
| FORMAT MEMORIES | hfm_rx_en | Out | 1 | Rx header format memory enable signal |
| | hfm_rx_addr | Out | 9 | Rx header format memory address bus |
| | hfm_rx_data_a | In | 16 | Rx header format memory data bus from format memory A |
| | hfm_rx_data_b | In | 16 | Rx header format memory data bus from format memory A |
| | bfm_rx_en | Out | 1 | Rx body format memory enable signal |
| | bfm_rx_addr | Out | 8 | Rx body format memory address bus |
| | bfm_rx_data_a | In | 16 | Rx body format memory data bus from format memory A |
| | bfm_rx_data_b | In | 16 | Rx body format memory data bus |
| | ufm_rx_en | Out | 1 | Rx uncommitted data format memory enable signal |
| | ufm_rx_addr | Out | 7 | Rx uncommitted data format memory address bus |
| | ufm_rx_data_a | In | 11 | Rx uncommitted data format memory data bus from format memory A |
| | ufm_rx_data_b | In | 11 | Rx uncommitted data format memory data bus |

Figure 16:
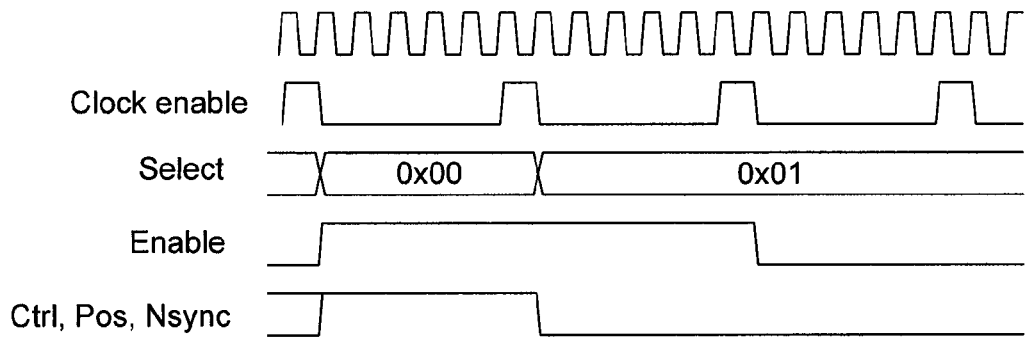
FIG. 16 illustrates DEMUX control output timing for stuff and unstuff interface operations.

One example of suitable output signal timing for the DEMUX control block is illustrated in FIG. 16 and is essentially the same as the timing for the MUX control: The clock is in this case assumed to be faster than composite clock and the clock enable therefore only active every sixth clock cycle. Another clock scenario is when the clock is the same as the composite clock. The clock enable will in this case be asserted all the time.

Format Memory

Figure 17:
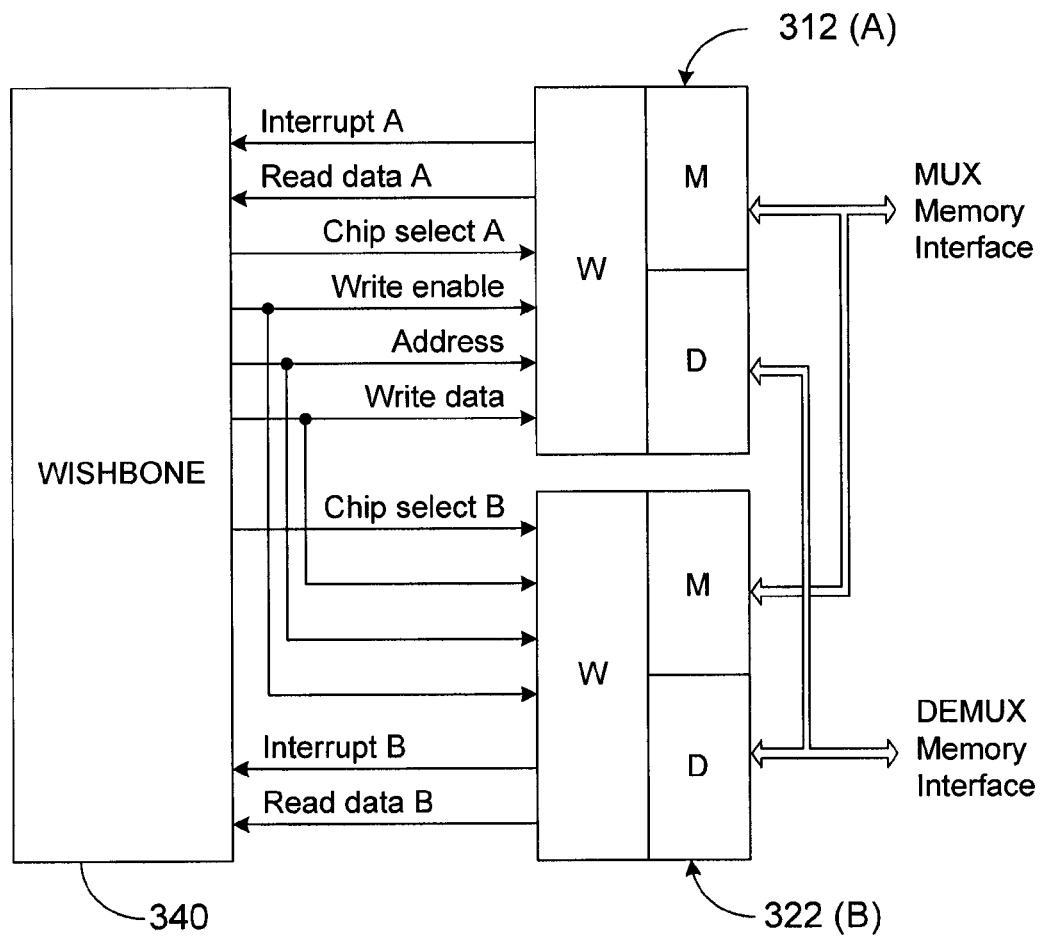
FIG. 17 illustrates a structure for selective scheduling of either of a pair of format memories.

In the illustrated embodiment, each format memory 312, 322 contains frame format and constitution information. There are thus two identical memory banks where two different frame formats may be stored; see FIG. 17. In FIG. 17, the components and memory areas marked Wishbone or W are in the domain of the Wishbone clock; those marked M are in the domain of the Tx clock; and those marked D are in the domain of the Rx clock.

One advantage of having multiple format memories is that this allows for dynamic frame format switches at the start of a new frame. The frame formats may be stored in the memories via the Wishbone interface 340, by which they may also be read.

Figure 18:
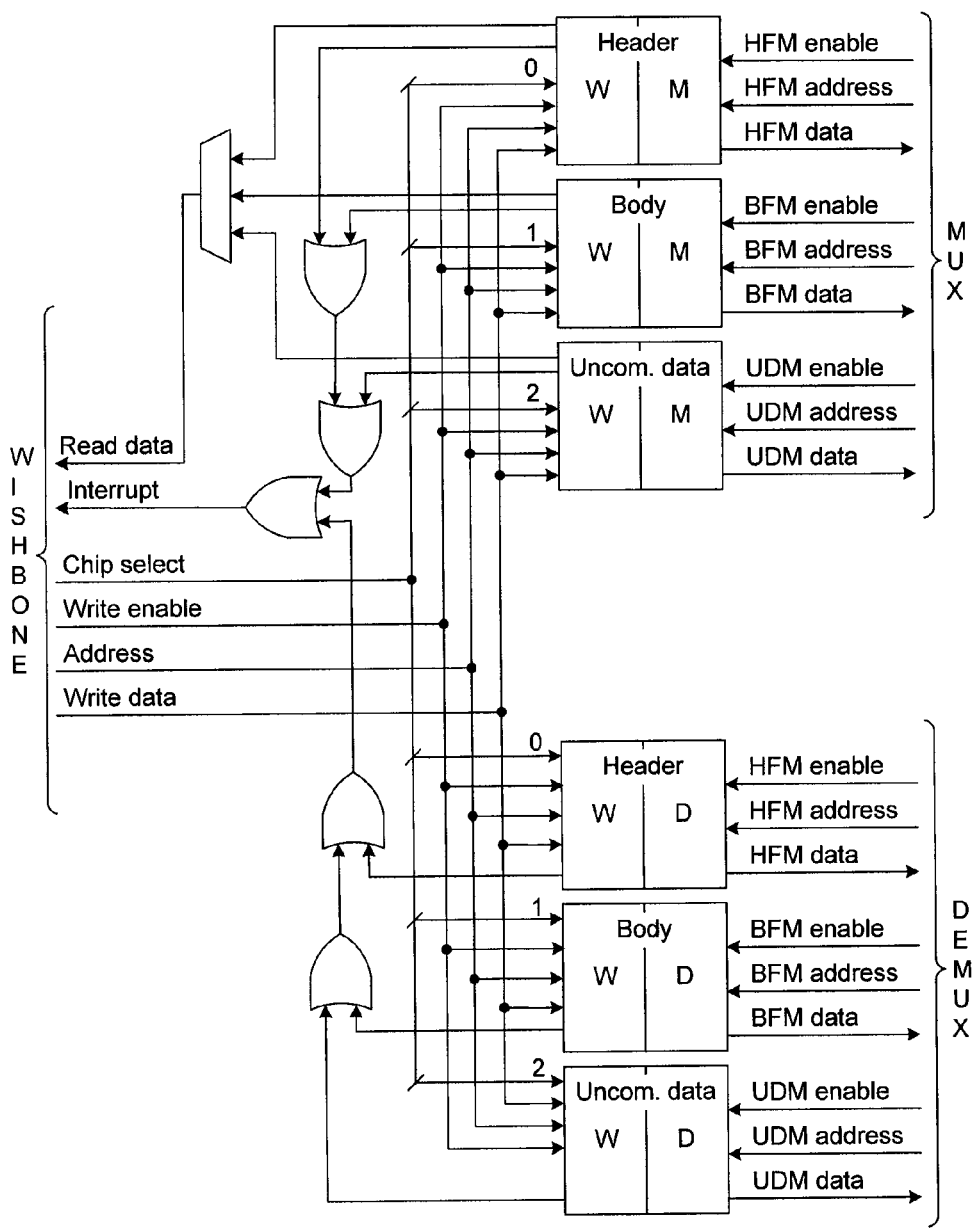
FIG. 18 illustrates format memory ports.

Each format memory is preferably shared between the MUX and the DEMUX. This implies that three-port asynchronous memories are required. The illustrated implementation, however, masks two dual-port block RAM memories as a three-port memory. In the illustrated example, the Wishbone interface 340 is the only interface that writes to the memories 312, 322, and may write simultaneously to both memories using the same chip select. However, a Read Data port on the Wishbone interface need contain only data from the MUX memories, as shown in FIG. 18. In FIG. 18, memory regions marked M are in the domain of the Tx clock; those marked D are in the domain of the Rx clock; and remaining regions and components (including the Wishbone and the regions marked W) are in the domain of the Wishbone clock.

As illustrated, all of the block RAM address and data outputs are present on the MUX and DEMUX port interfaces. This enables simultaneous accesses, which are required when the header is minimal or it is necessary to determine the amount of uncommitted data at the end of a sub-frame body. Each memory 312, 322 may be provided with a parity encoder and decoder (not shown) such that an interrupt to the Wishbone block 340 is asserted when a parity error is detected.

Header Memory

Figure 19:
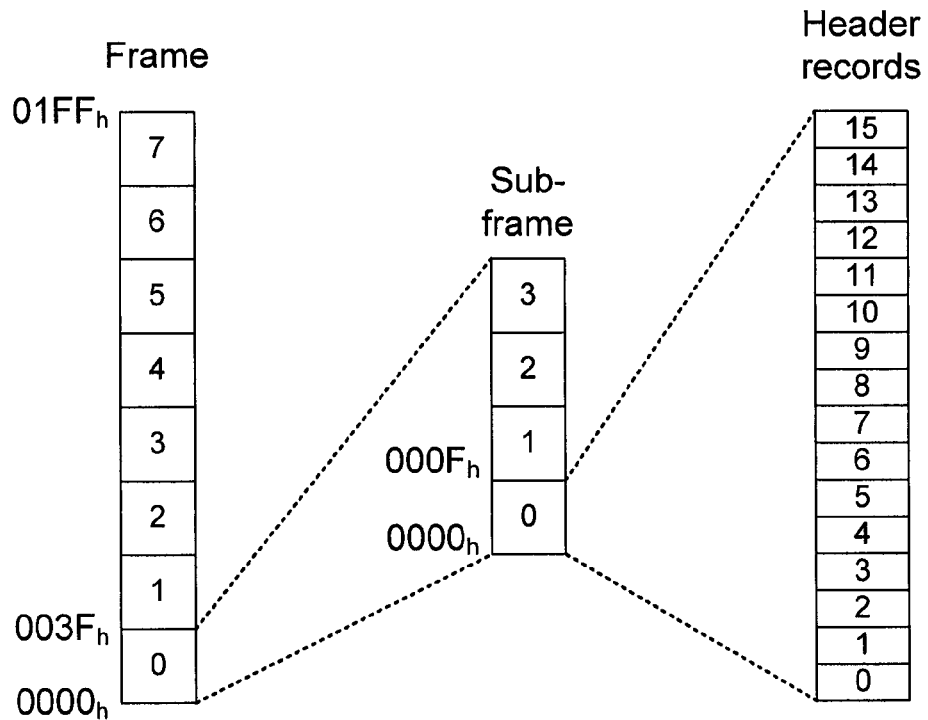
FIG. 19 shows one example of a configuration of a frame header memory.

The header memory, that is, the memory address space used to store the frame header, contains information of the header, with the exception of the mandatory FAW and PHASE records. The memory may be, for example, 512×18 bits, of which two out of 18 bits are used for parity. The memory may be divided into eight 64×16-bit sections, with each section being associated with the corresponding frame in a multi-frame. Each section may then be subsequently divided into four 16×16-bit areas of header records, with area corresponding to a sub-frame in that frame. FIG. 19 illustrates one possible header memory configuration.

Some form of parity protection is preferably provided for each memory, such that the parity bit(s) is encoded at memory write and decoded at memory read on either of the two read ports. An interrupt may then be asserted when a parity error is detected by either memory.

Body Memory

The body memory, that is, the memory address space used to store the frame body, may, for example, be 256×18 bits, with, for example, two parity bits. The body memory contains column records for the frame body and each record state a tributary port, valid number of bytes in that column and a stuffing enable flag. When the stuffing enabled flag is set, stuffing may be inserted in that column. Padding bytes from the PAD register are inserted instead of data when the valid number of bytes is exceeded. As with the header memory, one or more parity bits may be encoded at memory write and decoded at memory read on either of the two read ports. An interrupt may then be asserted when a parity error is detected by either memory 312, 322.

Uncommitted Data Memory

Figure 20:
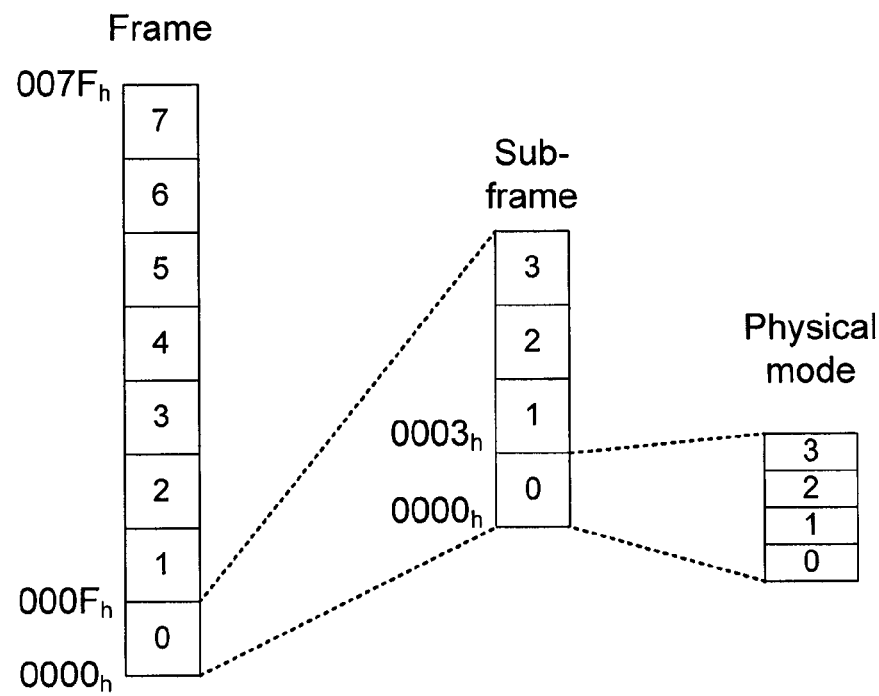
FIG. 20 shows one example of a configuration of format memory for uncommitted data.

The uncommitted data memory, that is, the memory address space used to store uncommitted data, may be, for example, 128×12 bits, including at least one parity bit. This memory portion may use the same constitution as the header memory, with frame sections and sub-frame areas. Each area may contain several field, for example, four fields, one for each physical mode. FIG. 20 illustrates one possible memory configuration for uncommitted data format information. As before, parity may be arranged such that an error is detected by either memory 312, 322.

Interface

One example of a suitable signal interface is defined in Table 6:

TABLE 6

| | Signal | Dir | Width | Comment |
|---|---|---|---|---|
| WISHBONE | clk_wb_rst | In | 1 | Wishbone reset |
| | clk_wb | In | 1 | Wishbone clock |
| | clk_wb_en | In | 1 | Wishbone clock enable |
| | fm_wb_cs | In | 3 | Format memory chip select signals for the Wishbone port interface. One chip select per memory bank: cs0 - Header format memory chip select cs1 - Body format memory chip select cs2 - Uncommitted PTP memory chip select |
| | fm_wb_we | In | 2 | Format memory write enable signal for the Wishbone port interface |
| | fm_wb_addr | In | 12 | Format memory address bus for the Wishbone port interface |
| | fm_wb_din | In | 16 | Format memory data input bus for the Wishbone port interface |
| | err_mem | Out | 1 | Memory parity error indication |
| | fm_wb_dout | Out | 16 | Format memory data output bus for the Wishbone port interface |
| MUX | clk_tx_comp_rst_n | In | 1 | Tx reset |
| | clk_tx_comp | In | 1 | Tx system clock |
| | clk_tx_comp_en | In | 1 | Tx clock enable |

TABLE 6-continued

| | Signal | Dir | Width | Comment |
|---|---|---|---|---|
| | hfm_tx_en | In | 1 | Tx header format memory enable signal |
| | hfm_tx_addr | In | 9 | Tx header format memory address bus |
| | hfm_tx_data | Out | 16 | Tx header format memory data bus |
| | bfm_tx_en | In | 1 | Tx body format memory enable signal |
| | bfm_tx_addr | In | 8 | Tx body format memory address bus |
| | bfm_tx_data | Out | 16 | Tx body format memory data bus |
| | ufm_tx_en | In | 1 | Tx uncommitted data format memory enable signal |
| | ufm_tx_addr | In | 7 | Tx uncommitted data format memory address bus |
| | ufm_tx_data | Out | 11 | Tx uncommitted data format memory data bus |
| DEMUX | clk_rx_comp_rst_n | In | 1 | Rx reset |
| | clk_rx_comp | In | 1 | Rx system clock |
| | clk_rx_comp_en | In | 1 | Rx clock enable |
| | hfm_rx_en | In | 1 | Rx header format memory enable signal |
| | hfm_rx_addr | In | 9 | Rx header format memory address bus |
| | hfm_rx_data | Out | 16 | Rx header format memory data bus |
| | bfm_rx_en | In | 1 | Rx body format memory enable signal |
| | bfm_rx_addr | In | 8 | Rx body format memory address bus |
| | bfm_rx_data | Out | 16 | Rx body format memory data bus |
| | ufm_rx_en | In | 1 | Rx uncommitted data format memory enable signal |
| | ufm_rx_addr | In | 7 | Rx uncommitted data format memory address bus |
| | ufm_rx_data | Out | 11 | Rx uncommitted data format memory data bus |

MUX Data Path

Figure 21:
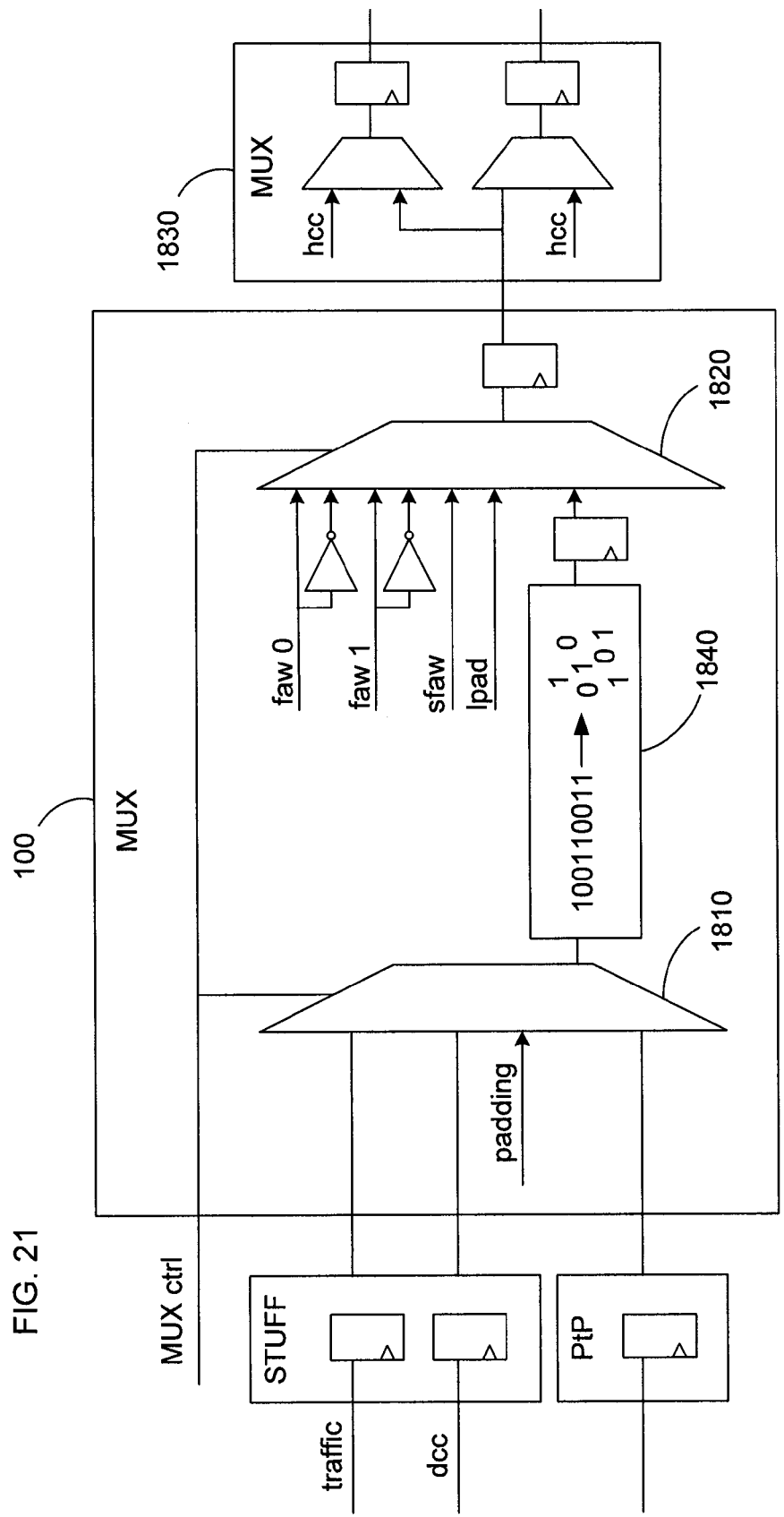
FIG. 21 illustrates a MUX data path delay.

As FIG. 21 illustrates, the MUX data path comprises a MUX 1810 within the larger MUX/DEMUX block 100 for traffic data traffic, DCC, PtP data and padding. This data may be scrambled in a scrambler 1800. A second MUX 1820 inserts the frame alignment word faw0, faw1, the sub-frame alignment word sfaw, and a last padding byte lpad. The MUX controller requests data from the various data sources and sets the MUX:es 1810, 1820 in the correct state to compose the composite output data. The HCC data is inserted in a separate MUX 1830 after the MUX data path as HCC is added and after a split point between the primary and redundant data stream.

Scrambler

A scrambler 1840 is preferably included to improve the frequency spectra of the data stream. Some data fields may not be scrambled, however, as they are used for synchronization in the receiver; consequently, these bytes are added after the scrambler. The scrambler is preferably halted during the insertion of these fields to keep the scrambler and the subsequent descrambler in sync. The multi-frame sync resets the scrambler to its initial state.

The scrambler 1840 may implement any known algorithm, depending on criteria that will be well know to telecommunications system designers. In one embodiment of the invention, the scrambler 1840 had three selectable polynomials:

$x^{23}+x^{18}+1$;
$x^{20}+x^{17}+1$; and
$x^{15}+x^{14}+1$, and it was also made possible to bypass the scrambler/descrambler altogether simply by setting the scrambler select to zero. The scrambler and descrambler can use the same implementation. The logical implementation of such polynomials is well understood.

Interface

According to one design specification of one embodiment of the invention, the signal interface for the MUX data path block was as illustrated in Table 7:

TABLE 7

| | Signal | Dir | Width | Comment |
|---|---|---|---|---|
| | clk_tx_comp_rst_n | In | 1 | Tx reset |
| | clk_tx_comp | In | 1 | Tx system clock |
| | clk_tx_comp_en | In | 1 | Tx clock enable |
| WISHBONE | tx_faw0 | In | 8 | Tx frame alignment word 0 |
| | tx_faw1 | In | 8 | Tx frame alignment word 1 |
| | tx_sfaw | In | 8 | Tx sub frame alignment word |
| | tx_pad | In | 8 | Tx data padding register |
| | tx_lpad | In | 8 | Tx last padding |
| | tx_scr_bypass | In | 1 | Scrambler bypass signal |

TABLE 7-continued

| Signal | Dir | Width | Comment |
|---|---|---|---|
| tx_scr_sel | In | 2 | Scrambler polynomial selector<br>00 - $x^{23} + x^{18} + 1$<br>01 - $x^{15} + x^{14} + 1$<br>10 - $x^{20} + x^{17} + 1$<br>11 - $x^{23} + x^{18} + 1$ |
| tx_mfs | In | 1 | Tx multi frame sync |
| tx_phase | In | 8 | Phase output signal |
| tx_scr_en | In | 1 | Scrambler enable signal. A deasserted enable signal holds the scrambler registers. |
| tx_traffic_mux_ctrl | Out | 2 | Data path MUX control signals |
| tx_header_mux_ctrl | Out | 4 | Data path MUX control signals |
| stf_txd | In | 8 | Tx tributary composite data |
| stf_dcc_txd | In | 8 | Tx DCC composite data |
| ptp_tx_data | In | 8 | Tx Point-To-Point data bus |
| tx_data_comp | Out | 8 | MUX composite data |

DEMUX Data Path

Figure 22:
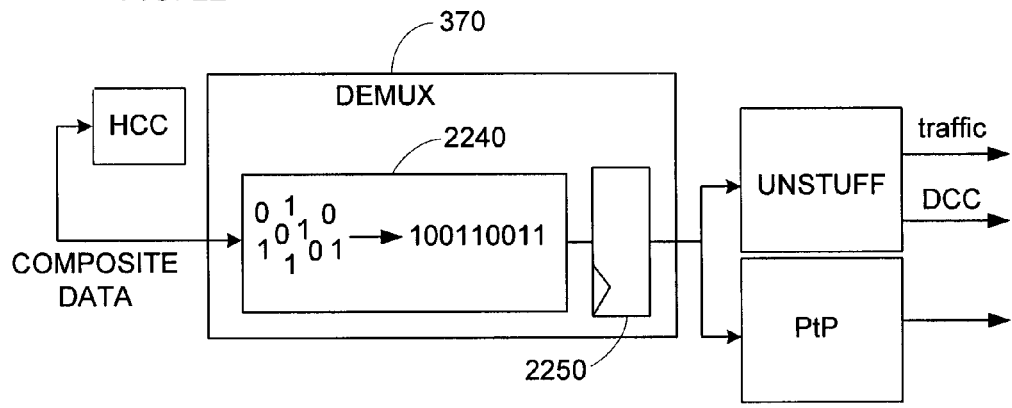
FIG. 22 illustrates a DEMUX data path delay.

As FIG. 22 illustrates, the DEMUX 370 comprises a descrambler 2240 and an output register 2250; the names of these components also indicate their functions, as will be understood by skilled telecom engineers.

Interface

According to the same design specification mentioned above, the signal interface for the DEMUX data path block was as illustrated in Table 8:

TABLE 8

| Signal | Dir | Width | Comment |
|---|---|---|---|
| clk_rx_comp_rst_n | In | 1 | Rx reset |
| clk_rx_comp | In | 1 | Rx system clock |
| clk_rx_comp_en | In | 1 | Rx clock enable |
| rx_descr_bypass | In | 1 | Scrambler enable signal |
| rx_descr_sel | In | 2 | Scrambler polynomial selector<br>00 - $x^{23} + x^{18} + 1$<br>01 - $x^{15} + x^{14} + 1$<br>10 - $x^{20} + x^{17} + 1$<br>11 - $x^{23} + x^{18} + 1$ |
| rps_rx_mf_sync | In | 1 | Rx multi frame sync |
| rx_descr_en | In | 1 | Scrambler enable signal. A deasserted enable signal holds the descrambler registers. |
| rx_data_comp | In | 8 | DEMUX composite data |
| stf_txd | Out | 8 | Rx tributary composite data |
| stf_dcc_rxd | Out | 8 | Rx composite data tributary contributor output |
| ptp_rx_data | Out | 8 | Rx Point-To-Point data bus |

Wishbone

Figure 23:
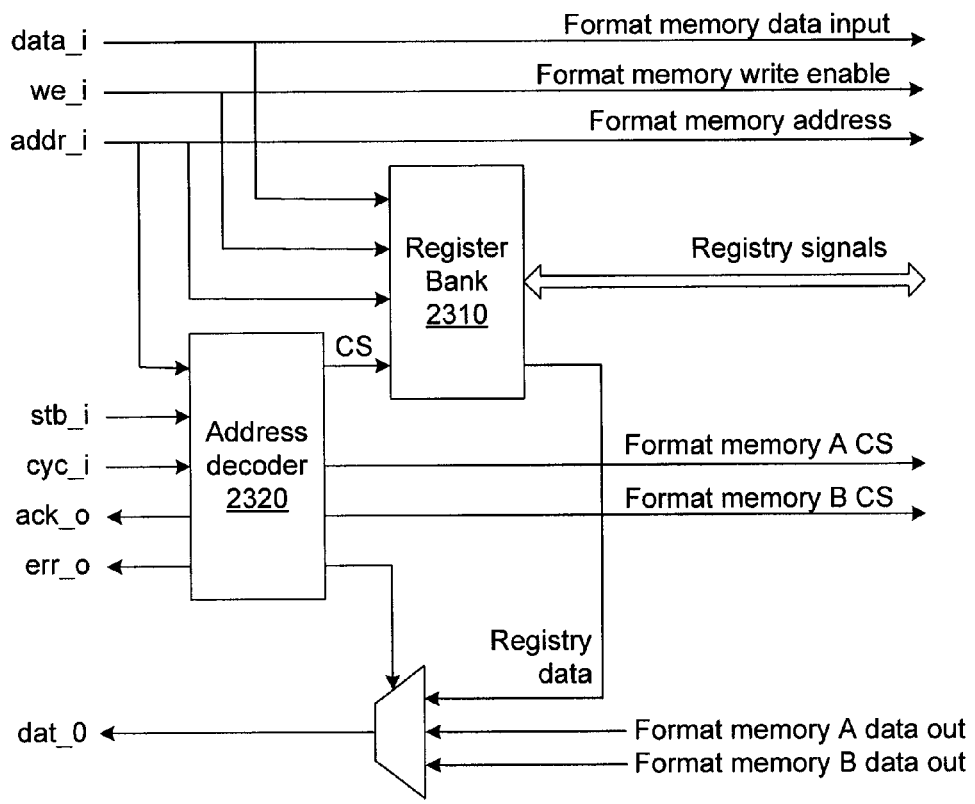
FIG. 23 illustrates components of a Wishbone block.

As FIG. 23 illustrates, the Wishbone block 340 terminates the Wishbone interface signals. The block contains a register bank 2310 and an interface—shown as the Address Decoder 2320—to the format memories 312, 322.

The address decoder block 2320 creates chip-select signals that are applied to the register bank 2310 and the format memories 312 (A) and 322 (B). The decoder block 2310 also generates bus termination signals ack_o and err_o at the appropriate time. Read accesses will add a wait state due to register clocking of the data output bus, but write accesses will not require any wait states.

The address decoder 2320, the format memories A and B, and the register bank 2310 may be clocked with the Wishbone clock. Note that most of the signals from the register bank 2310 to the various downstream control blocks are static once the Flat MUX setup is completed.

Table 9 shows a data sheet describing certain aspects of the Wishbone block 340 according to one design specification of one embodiment of the invention

TABLE 9

| Description | Specification | |
|---|---|---|
| Supported cycles | SLAVE, READ/WRITE | |
| Data port, size | 16-bit | |
| Data port, granularity | 16-bit | |
| Data port, max operand size | 16-bit | |
| Data transfer ordering | Big endian and/or little endian | |
| Data transfer sequencing | Undefined | |
| | Signal name | Wishbone equivalent |
| Supported signals list and equivalent wishbone signals. | wb_ack_o | ack_o |
| | wb_adr_i(15:0) | adr_i( ) |
| | wb_clk | clk_i |
| | wb_cyc_i | cyc_i |
| | wb_dat_i(15:0) | dat_i( ) |
| | wb_dat_o(15:0) | dat_o( ) |
| | wb_err_o | err_o |
| | wb_rst | rst_i |
| | wb_stb_i | stb_i |
| | wb_we_i | we_i |

Table 10 shows an example of the interface signals for the Wishbone block.

TABLE 10

| | Signal | Dir | Width | Comment |
|---|---|---|---|---|
| WISHBONE | clk_sys_rst_n | In | 1 | System reset |
| | clk_sys | In | 1 | System clock 131.072 MHz |
| | clk_tx_comp_rst_n | In | 1 | Tx reset |
| | clk_tx_comp | In | 1 | Tx clock |
| | clk_tx_comp_en | In | 1 | Tx clock enable |
| | clk_rx_comp_rst_n | In | 1 | Rx reset |
| | clk_rx_comp | In | 1 | Rx clock |
| | clk_rx_comp_en | In | 1 | Rx clock enable |
| | wb_rst | In | 1 | Wishbone reset input |

TABLE 10-continued

| | Signal | Dir | Width | Comment |
|---|---|---|---|---|
| | wb_clk | In | 1 | Wishbone clock input |
| | wb_clk_en | In | 1 | Wishbone clock enable input |
| | wb_stb_i | In | 1 | Wishbone strobe input. The strobe input, when asserted, indicates that the SLAVE is selected. |
| | wb_we_i | In | 1 | Wishbone write enable input. |
| | wb_adr_i | In | 16 | Wishbone adress input. |
| | wb_dat_i | In | 16 | Wishbone byte data input. |
| | wb_ack_o | Out | 1 | Wishbone Acknowledge output. The acknowledge output, when asserted, indicates the termination of a normal bus cycle. |
| | wb_err_o | Out | 1 | Wishbone error output. The error output indicates an abnormal cycle termination. |
| | wb_dat_o | Out | 16 | Wishbone byte data output. |
| FORMAT MEMORY | fm_wb_dout_a | In | 16 | Format memory data output bus for the Wishbone port interface |
| | fm_wb_dout_b | In | 16 | Format memory data output bus for the Wishbone port interface |
| | fm_wb_cs_a | Out | 3 | Format memory A chip select signals for the Wishbone port interface. One chip select per memory bank:<br>cs0 - Header format memory A chip select<br>cs1 - Body format memory A chip select<br>cs2 - Uncommitted data memory A chip select |
| | fm_wb_cs_b | Out | 3 | Format memory B chip select signals for the Wishbone port interface. One chip select per memory bank:<br>cs0 - Header format memory B chip select<br>cs1 - Body format memory B chip select<br>cs2 - Uncommitted data memory B chip select |
| | fm_wb_we | Out | 1 | Format memory write enable signal for the Wishbone port interface |
| | fm_wb_addr | Out | 12 | Format memory address bus for the Wishbone port interface |
| | fm_wb_din | Out | 16 | Format memory data input bus for the Wishbone port interface |
| MUX | tx_sf0lr | Out | 16 | Tx sub frame 0 length register |
| | tx_sf1lr | Out | 16 | Tx sub frame 1 length register |
| | tx_sf2lr | Out | 16 | Tx sub frame 2 length register |
| | tx_sf3lr | Out | 16 | Tx sub frame 3 length register |
| | tx_mfl | Out | 4 | Tx multi frame length |
| | tx_num | Out | 16 | Tx clock fractional divider numerator |
| | tx_denom | Out | 16 | Tx clock fractional divider denominator |
| | tx_faw0 | Out | 8 | Tx frame alignment word 0 |
| | tx_faw1 | Out | 8 | Tx frame alignment word 1 |
| | tx_sfaw | Out | 8 | Tx sub frame alignment word |
| | tx_pad | Out | 8 | Tx data padding register |
| | tx_lpad | Out | 8 | Tx last padding |
| | tx_ncols | Out | 8 | Number of columns in payload |
| | tx_nrows | Out | 8 | Number of rows in payload |
| | tx_ff | Out | 1 | Frame format memory register control signal |
| | tx_phy_mode | Out | 2 | Physical mode register control signal |
| | tx_scr_bypass | Out | 1 | Scrambler enable register signal |
| | tx_scr_sel | Out | 2 | Scrambler polynom select<br>00 - $x^{23} + x^{18} + 1$<br>01 - $x^{15} + x^{14} + 1$<br>10 - $x^{20} + x^{17} + 1$<br>11 - $x^{23} + x^{18} + 1$ |

TABLE 10-continued

| | Signal | Dir | Width | Comment |
|---|---|---|---|---|
| DEMUX | rx_ncols | Out | 8 | Number of columns in payload |
| | rx_nrows | Out | 8 | Number of rows in payload |
| | rx_mfl | Out | 4 | Rx multi frame length |
| | rx_phy_mode | Out | 2 | Physical mode register control signal |
| | rx_descr_bypass | Out | 1 | Scrambler enabler register signal |
| | rx_descr_sel | Out | 2 | Descrambler polynom select<br>00 - $x^{23} + x^{18} + 1$<br>01 - $x^{15} + x^{14} + 1$<br>10 - $x^{20} + x^{17} + 1$<br>11 - $x^{23} + x^{18} + 1$ |
| | rx_ais_mode | Out | 1 | AIS mode:<br>0 - Automatic<br>1 - Manual |
| | rx_ais_on | Out | 1 | AIS on signal. Controls the AIS ordering when rx_ais_mode is in manual mode. |
| RPS | rps_faw0r | Out | 8 | Frame alignment word 0 |
| | rps_faw1r | Out | 8 | Frame alignment word 1 |
| | rps_sfawr | Out | 8 | Sub frame alignment word |
| | rps_fmfr | Out | 4 | Frames per multi frame register |
| | rps_sf0_len | Out | 16 | Sub frame 0 length register |
| | rps_sf1_len | Out | 16 | Sub frame 1 length register |
| | rps_sf2_len | Out | 16 | Sub frame 2 length register |
| | rps_sf3_len | Out | 16 | Sub frame 3 length register |
| | rps_num | Out | 16 | Rx clock fractional divider numerator |
| | rps_denom | Out | 16 | Rx clock fractional divider denominator |
| | stf_tx_fifo_ref | Out | 8 | Tx stuffing buffer FIFO level reference |
| | stf_tx_ais | Out | 1 | Tx AIS generation control signal |
| | stf_rx_fifo_ref | Out | 8 | Rx stuffing buffer FIFO level reference |
| | stf_dcc_fmfr | Out | 4 | Frames per multi frame register |

Figure 24:
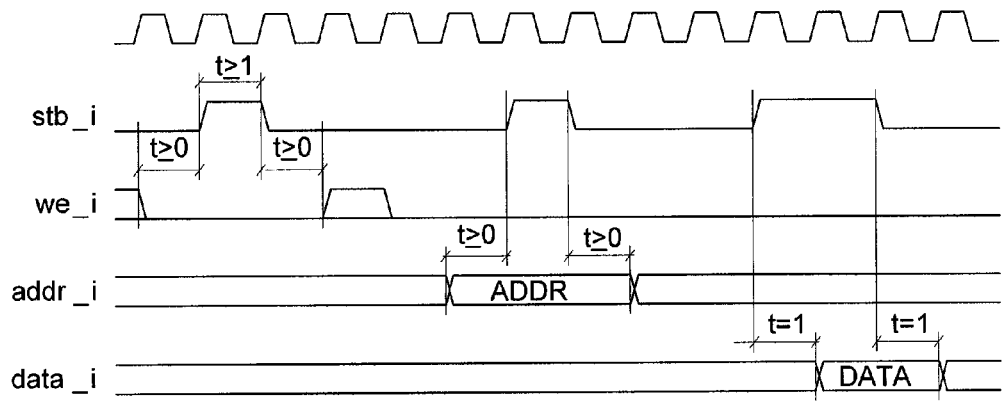
FIGS. 24 and 25 illustrate one example of single-read and single-write timing diagrams, respectively, for the Wishbone block.
Figure 25:
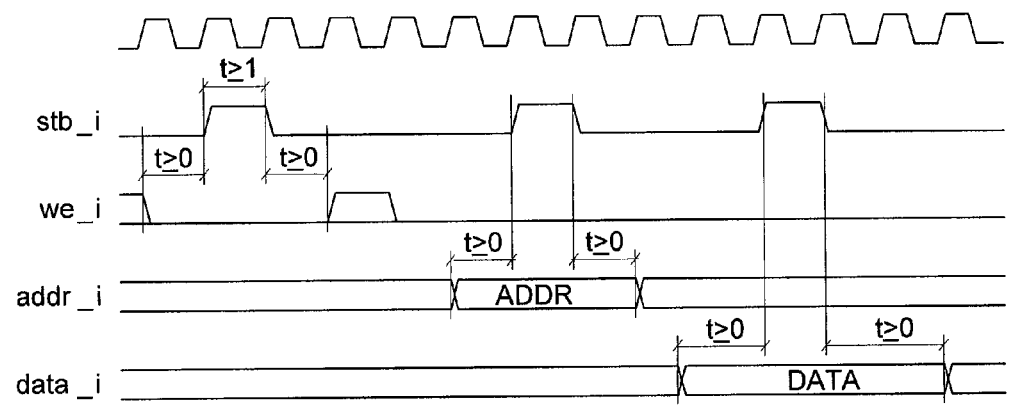

FIGS. 24 and 25 illustrate one example of single-read and single-write timing diagrams, respectively, for the Wishbone block 370.

Table 11 lists various signals included in the external interface of one embodiment of the invention. As with several of the other Tables included above, it is not necessary for an understanding of any aspect of this invention to have a full description of most of the signals listed in this Table 11. On the other hand, telecommunications engineers will gain some insight into some of the aspects of one particular specified design of one implementation of the invention by considering these signals in relation to the components into or out of which they pass. Table 11 is thus included here merely for the sake of completeness. Of course, the digital signal widths (in bits), chosen values indicating various states (such as 0 or 1), number of parity bits, etc., are all design choices that may be varied according to the needs of any given implementation of the invention.

TABLE 11

| | Signal | Dir | Width | Comment |
|---|---|---|---|---|
| Clock | clk_sys_rst_n | In | 1 | System reset |
| and | clk_sys | In | 1 | System clock |
| reset | clk_tx_comp_rst_n | In | 1 | Tx reset |
| | clk_tx_comp | In | 1 | Tx system clock |
| | clk_tx_comp_en | In | 1 | Tx clock enable |
| | clk_rx_comp_rst_n | In | 1 | Rx reset |
| | clk_rx_comp | In | 1 | Rx system clock |
| | clk_rx_comp_en | In | 1 | Rx clock enable |
| WISHBONE | clk_wb_rst | In | 1 | Wishbone reset input |
| | clk_wb | In | 1 | Wishbone clock input |
| | clk_wb_en | In | 1 | Wishbone clock enable input |
| | wb_stb_i | In | 1 | Wishbone strobe input. The strobe input, when asserted, indicates that the SLAVE is selected. |
| | wb_we_i | In | 1 | Wishbone write enable input. |
| | wb_cyc_i | In | 1 | The cycle input, when asserted, indicates that a valid bus cycle is in progress |

TABLE 11-continued

| | Signal | Dir | Width | Comment |
|---|---|---|---|---|
| | wb_adr_i | In | 16 | Wishbone adress input. |
| | wb_dat_i | In | 8 | Wishbone byte data input. |
| | wb_ack_o | Out | 1 | Wishbone Acknowledge output. The acknowledge output, when asserted, indicates the termination of a normal bus cycle. |
| | wb_err_o | Out | 1 | Wishbone error output. The error output indicates an abnormal cycle termination. |
| | wb_dat_o | Out | 8 | Wishbone byte data output. |
| | err_mem_a | Out | 1 | Memory parity error indication |
| | err_mem_b | Out | 1 | Memory parity error indication |
| RPS | rps_rx_mf_sync | In | 1 | Rx multi frame sync |
| | rps_rx_f_sync | In | 1 | Rx frame sync |
| | rps_rx_sf_sync | In | 1 | Rx sub frame sync |
| | rps_rx_ff | In | 1 | Rx frame format |
| | rps_locked | In | 1 | Composite frame locked |
| | rps_faw0r | Out | 8 | Frame alignment word 0 |
| | rps_faw1r | Out | 8 | Frame alignment word 1 |
| | rps_sfawr | Out | 8 | Sub frame alignment word |
| | rps_fmfr | Out | 4 | Frames per multi frame register |
| | rps_sf0_len | Out | 16 | Sub frame 0 length register |
| | rps_sf1_len | Out | 16 | Sub frame 1 length register |
| | rps_sf2_len | Out | 16 | Sub frame 2 length register |
| | rps_sf3_len | Out | 16 | Sub frame 3 length register |
| | rps_num | Out | 16 | Rx clock fractional divider numerator |
| | rps_denom | Out | 16 | Rx clock fractional divider denominator |
| STUFF & UNSTUFF BUFFERS | stf_txd | In | 8 | Tx composite data contribution |
| | stf_tx_mf_pulse | Out | 1 | Tx multi frame pulse. This signal is used to sample the stuffing FIFO level. |
| | stf_tx_ctrl | Out | 1 | Tx stuffing control. A high value indicates that the current output data contains a stuffing control bit. |
| | stf_tx_pos | Out | 1 | Tx stuffing position. A high value indicates that the current output data shall insert a data bit or stuffing bit depending on the stuff flag. |
| | stf_tx_en | Out | 1 | Tx stuffing buffer enable signal |
| | stf_tx_sel | Out | 8 | Tx stuffing buffer tributary contributor selection signal |
| | stf_tx_fifo_ref | Out | 8 | Tx stuffing buffer FIFO level reference |
| | stf_tx_ais | Out | 1 | Tx AIS generation control signal |
| | stf_rx_ctrl | Out | 1 | Rx stuffing control. A high value indicates that the current output data contains a stuffing control bit. |
| | stf_rx_pos | Out | 1 | Rx stuffing position. A high value indicates that the current output data contains a data bit or stuffing bit depending on the previous stuffing control bits. |
| | stf_rx_en | Out | 1 | Rx enable input |
| | stf_rx_sel | Out | 8 | Rx tributary contributor selection signal |
| | stf_rxd | Out | 8 | Rx composite data tributary contributor output |
| | stf_rx_fifo_ref | Out | 8 | Rx stuffing buffer FIFO level reference |
| | stf_rx_ais | Out | 1 | Rx AIS generation control signal |
| DCC | stf_dcc_txd | In | 8 | DCC Tx composite data contribution |
| | stf_dcc_tx_stf_en | Out | 1 | DCC Tx stuffing enable signal 0 - stuffing is disabled 1 - stuffing is enabled |
| | stf_dcc_tx_en | Out | 1 | DCC Tx data output enable |

TABLE 11-continued

| | Signal | Dir | Width | Comment |
|---|---|---|---|---|
| | stf_dcc_tx_nsync | Out | 1 | DCC Tx nsync data output enable. A high value indicates that the stuffing buffer should supply a new byte with stuffing information. |
| | stf_dcc_tx_sel | Out | 2 | DCC Tx channel selection |
| | stf_dcc_rx_stf_en | Out | 1 | DCC Rx stuffing enable signal 0 - stuffing is disabled 1 - stuffing is enabled |
| | dcc_rx_en | Out | 1 | DCC Rx data enable |
| | stf_dcc_rx_nsync | Out | 1 | DCC Rx nsync data output enable. A high value indicates that the current data contains a stuffing control bit. |
| | stf_dcc_rx_sel | Out | 2 | DCC Rx channel selection |
| | stf_dcc_rxd | Out | 8 | DCC Rx composite data tributary contributor output |
| | stf_dcc_fmfr | Out | 4 | Frames per multi frame register |
| HCC | hcc_tx_en | In | 1 | Produces new COMP_TXn output, n is selected by SEL_TX. |
| | hcc_tx_sel | In | 2 | HCC Tx select input, channel 0-3. |
| | hcc_rx_en | Out | 1 | Indicates that the current input data shall be used as input for the channel selected by hcc_rx_sel. |
| | hcc_rx_sel | Out | 2 | HCC Rx select input, channel 0-3. |
| PTP | ptp_tx_clk | Out | 1 | Tx Point-To-Point clock output |
| | ptp_tx_en | Out | 1 | Tx Point-To-Point clock enable |
| | ptp_tx_data | In | 8 | Tx Point-To-Point data bus |
| | ptp_rx_clk | Out | 1 | Rx Point-To-Point clock output |
| | ptp_rx_en | Out | 1 | Rx Point-To-Point clock enable |
| | ptp_rx_data | Out | 8 | Rx Point-To-Point data bus |
| | ptp_cap | Out | 8 | Point-To-Point capacity information. The current capacity requirement is indicated in steps of 2048 kbit/s, e.g. 0x04 => 10192 kbit/s. |
| | tx_data_comp | Out | 8 | MUX composite data |
| | frac_tx_comp_en | Out | 1 | Tx clock enable, rising clock edge, generated from internal fractional divider. |
| | frac_tx_comp_en_inv | Out | 1 | Tx clock enable, falling clock edge, generated from internal fractional divider. |
| | frac_tx_comp | Out | 1 | Tx output composite clock generated from internal fractional divider. |
| | rx_data_comp | In | 8 | DEMUX composite data |

Some of the advantageous features of the invention include:

The Flat MUX described above has several advantages over the prior art, some or all of which may be implemented in any particular chosen configuration of the invention. As already mentioned, being non-hierarchical, the Flat MUX can multiplex and demultiplex signals using a single MUX/DE-MUX structure.

In the embodiment of the invention discussed primarily above, the data from different signal sources, according to different standards, may be stored in at least one format memory in a "matrix" representation (row, column). Each "row" included both committed and uncommitted (if any) data and the data is transmitted row-by-row. In other words, committed and uncommitted data is transmitted alternately. This eliminates the need found in the prior art to transmit all committed data as a block followed by all committed data as a block. One consequence of this structure is that users can switch from the PDH standard to a packet-based standard (Ethernet, SDH, etc.) gradually, with no need to replace or reconfigure hardware.

Prior art, standardized MUXes for multiplexing several E1s into a composite rate are limited to fixed frame formats. For example, a PDH MUX according to the E1-to-E2 multiplexing scheme specified in the ITU-T standard G.742 specifies a format for multiplexing four E1 channels into one E2 channel. The Flat MUX according to the invention, however, is much more flexible, and sets no theoretical limit on the number of E1s and E3s that it can multiplex into a single composite signal. Any combination of E1s and E3s is also possible, and it is possible to both add and reduce the number of E1s and E3s without disturbing the traffic on the already existing E1s and E3s.

One other unique feature of the invention is that it makes it possible to include a variable-rate bit pipe in the composite signal.

An additional advantage is that the Flat MUX supports adaptive modulation, such that if the composite rate changes, the bit-pipe rate will follow the composite rate so that the composite payload is most efficiently utilized.

This adaptive ability can, moreover, typically be accomplished without introducing bit faults. Similarly, bit faults are also reduced or eliminated during re-allocation of user bandwidth between PDH channels and the bit-pipe, at least with respect to the PDH channels not affected by the reallocation.

Note that control information may be transported on dedicated channels so as to avoid negatively impacting this utilization. The Flat MUX is also particularly error-tolerant—stuffing control may be designed so as to tolerate on the order of 50 randomly distributed errors under certain conditions.

The Flat MUX also reduced the impact of intrinsic jitter and wander introduced on PDH rates that are caused by frequency differences between the composite rate and the MUX framing rate.

Note also that the illustrated embodiment of the MUX itself can carry SSM information.

The illustrated MUX has a simple design, which reduces logic consumption. Moreover, the MUX—only one exemplifying embodiment of which is discussed in detail above—is easily adaptable, for example, to the ANSI standard.

The invention claimed is:

1. A multiplexer/demultiplexer (MUX/DEMUX) system for multiplexing and demultiplexing information from a plurality of traffic channels configured according to a Plesiochronous Digital Hierarchy (PDH) standard into a composite signal transferred to and from a telecommunications interface, wherein the system comprises:
   a PDH traffic interface receiving PDH channel signals from a plurality of PDH channels;
   a bit-pipe interface receiving a bit-pipe traffic data stream having a variable rate and including data transported as packages;
   a composite signal generation module and interface that outputs and receives a single composite serial data stream including, in a single composite format, information from the received PDH channel signals as well as the bit-pipe traffic stream;
   a MUX frame controller;
   a frame synchronization generator that generates frame syncs for the MUX frame controller;
   said MUX frame controller being arranged to sense a change in a rate of the composite serial data stream and thereupon being arranged to change the capacity of the variable-rate bit-pipe accordingly, but without changing a frame structure of the composite serial data stream,
   at least one frame format memory arranged for storing frame format descriptions, each frame format description including a first portion for committed data and a second portion for any uncommitted data, wherein the frame format descriptions are expressed as records, such that each record activates a corresponding source and enables the data path MUX to form the composite data stream the frame format descriptions being stored such that committed and uncommitted data are transmitted alternately; and
   the composite signal generation module and interface being arranged for generating the single composite serial data stream by sequentially reading the frame format descriptions from the frame format memory, thereby alternately reading and adding to the single composite serial data stream the first and second portions.

2. The system as defined in claim 1, wherein the plurality of PDH channels comprises more than four PDH channels.

3. The system as defined in claim 2, wherein the plurality of PDH channels are configured according to the E1, E2 or E3 standards.

4. The system as defined in claim 1 wherein the bit-pipe traffic data stream includes data transported according to the Ethernet packet-framing standard.

5. The system as defined in claim 1, wherein the bit-pipe traffic data stream includes data transported according to a Synchronous Digital Hierarchy (SDH) protocol.

6. The system as defined in claim 1, wherein in that the first portions each store data according to the E1 standard.

7. A method for multiplexing/demultiplexing (MUX/DEMUX) information from a plurality of traffic channels configured according to a Plesiochronous Digital Hierarchy (PDH) standard into a composite signal transferred to and from a telecommunications interface, where the method comprises the following steps:
   receiving PDH channel signals from a plurality of PDH channels;
   receiving a bit-pipe traffic data stream having a variable rate and including data transported as packages;
   composing, outputting, and receiving a single composite serial data stream including, in a single composite format, information from the received PDH channel signals as well as the packet data stream,
   storing frame format descriptions in at least one frame format memory;
   sensing a change in a rate of the composite serial data stream and thereupon changing the capacity of the variable-rate bit-pipe accordingly, but without changing a frame structure of the composite serial data stream,
   storing frame format descriptions, each frame format description including a first portion for committed data and a second portion for any uncommitted data, wherein the frame format descriptions are expressed as records, such that each record activates a corresponding source and enables the data path MUX to form the composite data stream, the frame format descriptions being stored such that committed and uncommitted data are transmitted alternately;
   generating the single composite serial data stream by sequentially reading the frame format descriptions from storage, thereby alternately reading and adding to the single composite serial data stream the first and second portions.

8. The method as defined in claim 7, wherein the plurality of PDH channels comprises more than four PDH channels.

9. The method as defined in claim 8, wherein the plurality of PDH channels are configured according to the E1, E2 or E3 standards.

10. The method as defined in claim 7, wherein the bit-pipe traffic data stream includes data transported according to the Ethernet packet-framing standard.

11. The method as defined in claim 7, wherein the bit-pipe traffic data stream includes data transported according to a Synchronous Digital Hierarchy (SDH) protocol.

12. The method as defined in claim 7, wherein the first portions each store data according to the E1 standard.

13. A telecommunications system comprising:
   a basic node having a plurality of traffic channels, at least one of which is configured according to a Plesiochronous Digital Hierarchy (PDH) standard and at least one other of which comprises a bit-pipe traffic data stream;

a telecommunications interface;

a multiplexer/demultiplexer (MUX/DEMUX) system for multiplexing and demultiplexing information from the plurality of traffic channels, received from the basic node, into a composite signal that is transferred to and from the telecommunications interface, a PDH traffic interface receiving PDH channel signals from a plurality of PDH channels;

a bit-pipe interface receiving a bit-pipe traffic data stream having a variable rate and including data transported as packages;

a composite signal generation module and interface that outputs and receives a single composite serial data stream including, in a single composite format, information from the received PDH channel signals as well as the bit-pipe traffic stream;

a MUX frame controller;

a frame synchronization generator that generates frame syncs for the MUX frame controller;

said MUX frame controller being arranged to sense a change in a rate of the composite serial data stream and thereupon being arranged to change the capacity of the variable-rate bit-pipe accordingly, but without changing a frame structure of the composite serial data stream, at least one frame format memory arranged for storing frame format descriptions, each frame format description including a first portion for committed data and a second portion for any uncommitted data, wherein the frame format descriptions are expressed as records, such that each record activates a corresponding source and enables the data path MUX to form the composite data stream, the frame format descriptions being stored such that committed and uncommitted data are transmitted alternately;

the composite signal generation module and interface being arranged for generating the single composite serial data stream by sequentially reading the frame format descriptions from the frame format memory, thereby alternately reading and adding to the single composite serial data stream the first and second portions.

14. The system of claim 1, wherein the plurality of traffic channels comprises more than four PDH channels.

15. The system as defined in claim 14, wherein the PDH channels are configured according to the E1, E2 or E3 standards.

16. The system as defined in claim 13, wherein the bit-pipe traffic data stream includes data transported according to the Ethernet packet-framing standard.

17. The system as defined in claim 13, wherein the bit-pipe traffic data stream includes data transported according to a Synchronous Digital Hierarchy (SDH) protocol.

* * * * *

UNITED STATES PATENT AND TRADEMARK OFFICE
CERTIFICATE OF CORRECTION

| | | |
|---|---|---|
| PATENT NO. | : 8,660,146 B2 | Page 1 of 1 |
| APPLICATION NO. | : 12/812683 | |
| DATED | : February 25, 2014 | |
| INVENTOR(S) | : Wego et al. | |

It is certified that error appears in the above-identified patent and that said Letters Patent is hereby corrected as shown below:

In the Specification:

In Column 5, Line 61, delete "64 kbits" and insert -- 64 kbit/s --, therefor.

In Column 7, Line 63, delete "a as a" and insert -- as a --, therefor.

In Column 22, Line 20, delete "block 2310" and insert -- block 2320 --, therefor.

In Column 25, Line 40, delete "block 370." and insert -- block 340. --, therefor.

In the Claims:

In Column 31, Line 58, in Claim 1, delete "stream the" and insert -- stream, the --, therefor.

Signed and Sealed this
Fifth Day of August, 2014

Michelle K. Lee
*Deputy Director of the United States Patent and Trademark Office*